(12) United States Patent
Ravishankar et al.

(10) Patent No.: US 12,229,685 B2
(45) Date of Patent: Feb. 18, 2025

(54) MODEL SUITABILITY COEFFICIENTS BASED ON GENERATIVE ADVERSARIAL NETWORKS AND ACTIVATION MAPS

(71) Applicant: GE Precision Healthcare LLC, Milwaukee, WI (US)

(72) Inventors: Hariharan Ravishankar, Bangalore (IN); Rahul Venkataramani, Bangalore (IN); Prasad Sudhakara Murthy, Bangalore (IN); Annangi P. Pavan Kumar, Bangalore (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 1054 days.

(21) Appl. No.: 17/155,997

(22) Filed: Jan. 22, 2021

(65) Prior Publication Data
US 2022/0237467 A1    Jul. 28, 2022

(51) Int. Cl.
*G06N 3/088* (2023.01)
*G06N 3/045* (2023.01)
(52) U.S. Cl.
CPC ............. *G06N 3/088* (2013.01); *G06N 3/045* (2023.01)
(58) Field of Classification Search
CPC ............................... G06N 3/045; G06N 3/088
See application file for complete search history.

(56) References Cited

U.S. PATENT DOCUMENTS

| 2019/0012581 | A1* | 1/2019 | Honkala | G06V 10/758 |
| 2019/0370969 | A1* | 12/2019 | Katzmann | G06N 3/047 |
| 2019/0377984 | A1* | 12/2019 | Ghanta | G06F 18/2155 |
| 2021/0326661 | A1* | 10/2021 | Munoz Delgado | G06N 3/0475 |

OTHER PUBLICATIONS

Davide Abati, Angelo Porrello, Simone Calderara, Rita Cucchiara, "Latent Space Autoregression for Novelty Detection," arXiv:1807.01653. (Year: 2019).*

(Continued)

*Primary Examiner* — Kakali Chaki
*Assistant Examiner* — Robert N Day
(74) *Attorney, Agent, or Firm* — Amin, Turocy & Watson, LLP

(57) ABSTRACT

Systems/techniques that facilitate generation of model suitability coefficients are provided. In various embodiments, a system can access a model trained on a training dataset, and the system can compute a coefficient indicating whether the model is suitable for deployment on a target dataset, based on analyzing activation maps associated with the model. In some cases, the system can: train a generative adversarial network (GAN) to learn a distribution of training activation maps produced by the model; generate a set of target activation maps of the model, by feeding samples from the target dataset to the model; cause a generator of the GAN to generate synthetic training activation maps from the learned distribution of training activation maps; iteratively perturb inputs of the generator until distances between the synthetic training activation maps and the target activation maps are minimized; and aggregate the minimized distances to form the coefficient.

3 Claims, 20 Drawing Sheets

(56) References Cited

OTHER PUBLICATIONS

Chengwei Chen, Wang Yuan, Yuan Xie, Yanyun Qu, Yiqing Tao, Haichuan Song, Lizhuang Ma, "Novelty Detection via Non-Adversarial Generative Network," arXiv:2002.00522 (Year: 2020).*

Hyunsun Choi, Eric Jang, Alexander A. Alemi, "WAIC, but Why? Generative Ensembles for Robust Anomaly Detection," arXiv:1810.01392 (Year: 2018).*

Giovanni Mariani, Florian Scheidegger, Roxana Istrate, Costas Bekas, Cristiano Malossi, "BAGAN: Data Augmentation with Balancing GAN," arXiv:1803.09655 (Year: 2018).*

Tim Salimans, Han Zhang, Alec Radford, Dimitris Metaxas, "Improving GANs Using Optimal Transport," arXiv:1803.05573 (Year: 2018).*

Gal et al., "Dropout as a Bayesian Approximation: Representing Model Uncertainty in Deep Learning," arXiv:1506.02142v6 [stat.ML], 2015, 12 pages.

Schlegl et al., "f-AnoGAN: Fast unsupervised anomaly detection with generative adversarial networks," Medical image analysis 54, 2019, 24 pages.

Zhang, M. et al | A Generalized Approach to Determine Confident Samples for Deep Neural Networks on Unseen Data. Lecture Notes in Computer Science book series (LNCS, vol. 11840), 2019, 10 pages.

* cited by examiner

MODEL SUITABILITY COEFFICIENTS BASED ON GENERATIVE ADVERSARIAL NETWORKS AND ACTIVATION MAPS

TECHNICAL FIELD

The subject disclosure relates generally to deep learning models, and more specifically to model suitability coefficients based on generative adversarial networks and activation maps.

BACKGROUND

The parameters of a deep learning model can be randomly initialized and then updated during training. During such training, the deep learning model can be fed inputs from a training dataset. Due to practical limitations, it can often be the case that the training dataset might not be representative of the full range of inputs which the deep learning model can encounter when deployed in the field. In such case, it can be desirable to determine whether the deep learning model is suitable to be deployed on one or more target datasets that differ from the training dataset. Thus, systems and/or techniques that can evaluate the suitability of the deep learning model to be deployed on such target datasets can be desirable. Conventional systems/techniques for facilitating such evaluation include uncertainty methods and outlier methods, both of which are model-specific. That is, they cannot be utilized across different deep learning models without substantial change.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate model suitability coefficients based on generative adversarial networks and activation maps are provided.

According to one or more embodiments, a system is provided. The system can comprise a memory that can store computer-executable instructions. The system can further comprise a processor that can be operably coupled to the memory and that can execute the computer-executable instructions stored in the memory. In various embodiments, the computer-executable instructions can be executable to cause the processor to access a deep learning model that is trained on a training dataset. In various instances, the computer-executable instructions can be further executable to cause the processor to compute a model suitability coefficient that indicates whether the deep learning model is suitable for deployment on a target dataset, based on analyzing activation maps associated with the deep learning model. In various aspects, the computer-executable instructions can be further executable to cause the processor to train a generative adversarial network (GAN) to model a distribution of training activation maps of the deep learning model, based on samples from the training dataset. In various cases, the computer-executable instructions can be further executable to cause the processor to generate a set of target activation maps of the deep learning model, by feeding a set of samples from the target dataset to the deep learning model. In various instances, the computer-executable instructions can be further executable to cause the processor to cause a generator of the GAN to generate a set of synthetic training activation maps from the distribution of training activation maps of the deep learning model. In various aspects, the computer-executable instructions can be further executable to cause the processor to iteratively perturb inputs of the generator until distances between the set of synthetic training activation maps and the set of target activation maps are minimized. In various cases, the computer-executable instructions can be further executable to cause the processor to aggregate the minimized distances, wherein the model suitability coefficient is based on the aggregated minimized distances.

According to one or more embodiments, the above-described system can be implemented as a computer-implemented method and/or a computer program product.

DETAILED DESCRIPTION

Figure 1:
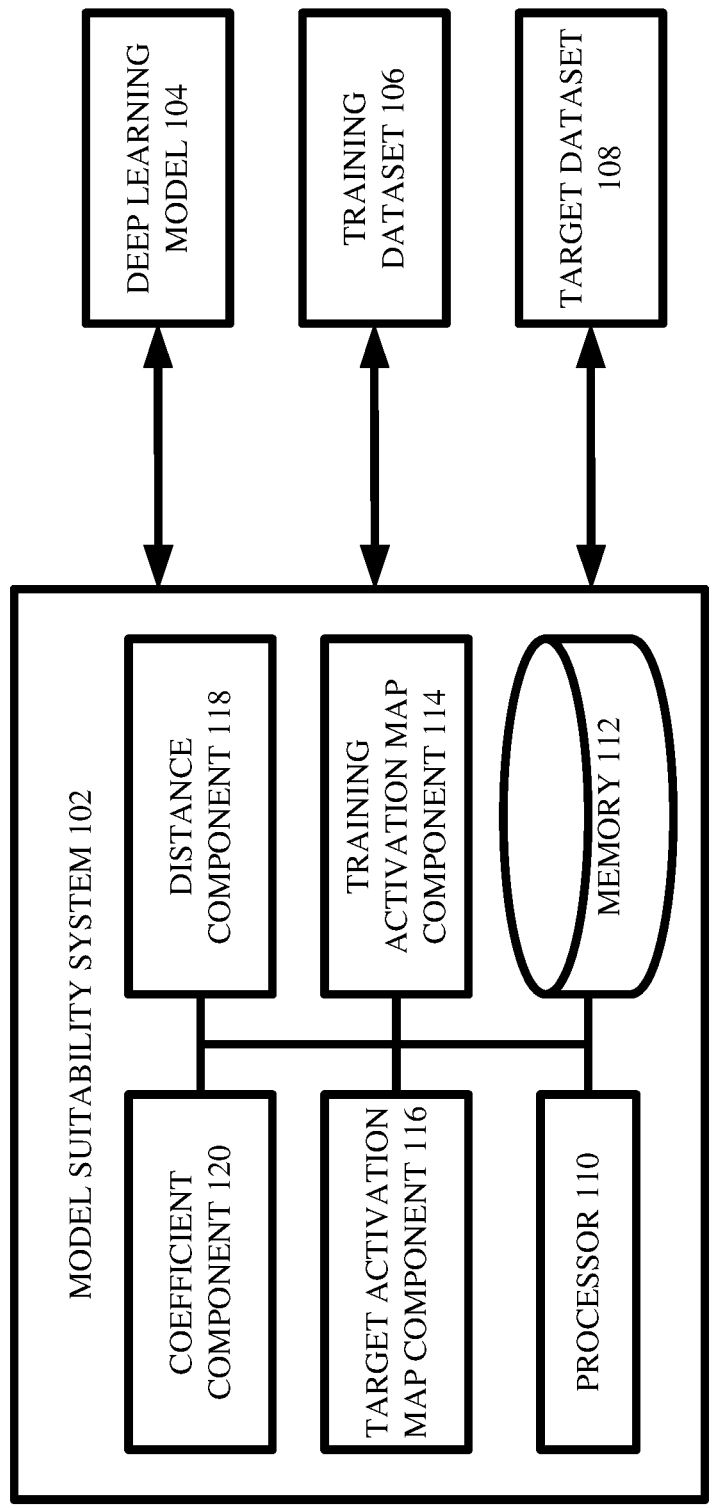
FIG. 1 illustrates a block diagram of an example, non-limiting system that facilitates model suitability coefficients based on generative adversarial networks and activation maps in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, the parameters (e.g., weights and/or biases) of a deep learning model (e.g., an artificial neural network) can be randomly initialized and then updated (e.g., via backpropagation) during training (e.g., supervised training, unsupervised training, reinforcement learning). During training, the deep learning model can receive inputs from a training dataset. For example, a deep learning model that classifies and/or segments images can be trained on a set of training images, and a deep learning model that classifies and/or segments audio files can be trained on a set of training audio files.

For ease of explanation, the herein teachings are discussed in relation to deep learning models that are configured to classify/label two-dimensional medical images in clinical contexts. However, it should be understood that this is exemplary and non-limiting. In various aspects, the herein teachings can be applied to any suitable deep learning model that is configured to generate any suitable type of result (e.g., classification, segmentation, determination, inference, prediction) in any suitable operational context (e.g., deep learning models that are configured to receive two-dimensional and/or three-dimensional image data with any suitable number of channels as input, deep learning models that are configured to receive one-dimensional and/or multi-dimensional sound data as input, and/or deep learning models that are configured to receive any other suitable data having any suitable dimensionality as input).

Due to practical limitations, it can often be the case that the training dataset might not be representative of the full range of inputs which the deep learning model can encounter when deployed in the field. In other words, it can be impracticable to create a training dataset that is large enough to encompass all possible input variations and/or background features toward which the deep learning model is desired to be agnostic. In such case, it can be desirable to determine whether the deep learning model is suitable to be deployed on one or more target datasets that differ and/or vary from the training dataset.

For example, consider a deep learning model that is configured to receive as input an X-ray image of a patient's chest and to produce as output a determination as to whether the X-ray image depicts a pneumothorax (e.g., a collapsed lung). Suppose that the deep learning model has been trained on X-ray images of the chests of male patients but has not been trained on X-ray images of the chests of female patients. In such case, it can be inferred that the deep learning model performs sufficiently well when analyzing X-ray images of male patients, but it can be unknown how the deep learning model will perform when analyzing X-ray images of female patients. In other words, the parameters of the deep learning model have been adjusted to achieve a sufficiently high specificity and/or sensitivity when analyzing X-ray images of male patients, but such specificity and/or sensitivity might not carry over to X-ray images of female patients (e.g., possibly due to sexually dimorphic biological differences that can manifest in X-ray images).

As another example, suppose that the deep learning model has been trained on X-ray images of the chests of geriatric patients but has not been trained on X-ray images of the chests of pediatric patients. In such case, it can be inferred that the deep learning model performs sufficiently well when analyzing X-ray images of geriatric patients, but it can be unknown how the deep learning model will perform when analyzing X-ray images of pediatric patients. In other words, the parameters of the deep learning model have been adjusted to achieve a sufficiently high specificity and/or sensitivity when analyzing X-ray images of geriatric patients, but such specificity and/or sensitivity might not carry over to X-ray images of pediatric patients (e.g., possibly due to age-related biological differences that can manifest in X-ray images).

As still another example, suppose that the deep learning model has been trained on X-ray images of the chests of patients without co-morbidities but has not been trained on X-ray images of the chests of patients with co-morbidities. In such case, it can be inferred that the deep learning model performs sufficiently well when analyzing X-ray images of patients without co-morbidities, but it can be unknown how the deep learning model will perform when analyzing X-ray images of patients with co-morbidities. In other words, the parameters of the deep learning model have been adjusted to achieve a sufficiently high specificity and/or sensitivity when analyzing X-ray images of patients without co-morbidities, but such specificity and/or sensitivity might not carry over to X-ray images of patients with co-morbidities (e.g., possibly due to biological differences associated with co-morbidities that can manifest in X-ray images).

As yet another example, suppose that the deep learning model has been trained on X-ray images taken via a particular type of scanner/protocol but has not been trained on X-ray images taken via other types of scanners/protocols. In such case, it can be inferred that the deep learning model performs sufficiently well when analyzing X-ray images captured by the particular type of scanner/protocol, but it can be unknown how the deep learning model will perform when analyzing X-ray images captured by other types of scanners/protocols. In other words, the parameters of the deep learning model have been adjusted to achieve a sufficiently high specificity and/or sensitivity when analyzing X-ray images produced by the particular type of scanner/protocol, but such specificity and/or sensitivity might not carry over to X-ray images produced by other types of scanners/protocols (e.g., possibly due to modality-related imaging artifacts that can manifest in X-ray images).

As illustrated by these non-limiting examples, the training dataset used to train the deep learning model can be different in one or more significant respects (e.g., different demographics, different device modalities) than a target dataset on which it is desired to deploy the deep learning model. In such cases, it can be unknown whether the deep learning model is suitable for deployment on the target dataset. If the deep learning model is not suitable for deployment on the target dataset, then deploying the deep learning model can result in inaccurate determinations/classifications. On the other hand, if the deep learning model is suitable for deployment on the target dataset, then additional training of the deep learning model can be wasteful of time and/or resources. Thus, there is a need for systems and/or techniques that, when given a training dataset, can automatically evaluate whether the deep learning model is suitable for deployment on a target dataset that differs from the training dataset.

Various embodiments of the subject innovation can address one or more of these technical problems. One or more embodiments described herein can include systems, computer-implemented methods, apparatus, and/or computer program products that can facilitate model suitability coefficients based on generative adversarial networks and/or activation maps. In various instances, embodiments of the subject innovation can be considered as a computerized tool that can automatically evaluate a deep learning model in order to determine whether the deep learning model is suitable for deployment on a target dataset that differs from a training dataset on which the deep learning model was trained. More specifically, the computerized tool can compute a mathematical quantity (e.g., a scalar, a vector, a matrix, a tensor) that indicates how well-suited the deep learning model is for deployment on the target dataset, which mathematical quantity can be referred to as a "model suitability coefficient." In other words, the model suitability coefficient can be considered as a score calculated by the computerized tool and that indicates a level of suitability of the deep learning model to be deployed on the target dataset. As explained herein, the computerized tool can compute the model suitability coefficient by analyzing activation maps of the deep learning model.

In various aspects, a deep learning model can comprise an input layer of neurons, an output layer of neurons, and one or more hidden layers of neurons, where the one or more hidden layers are between the input layer and the output layer. In various cases, each layer of the deep learning network can receive as input the output of the previous layer, where the input layer receives an input sample from a dataset. For example, the input sample can be a pixel array representing an image, and each neuron in the input layer can output a value of a corresponding pixel in the pixel array. In various aspects, each neuron in a given hidden layer can receive as input one or more outputted values from the previous layer, can form a linear combination of those one or more outputted values based on a set of weights and/or biases associated with the neuron, can apply a non-linear activation function (e.g., sigmoid) to the linear combination, and can output the result of the non-linear activation function to the next layer.

An activation map of a given hidden layer can be an array (e.g., of any suitable dimensionality) that contains some and/or all of the outputted values of the given hidden layer. In other words, an activation map can display the values that are generated by the non-linear activation functions of the given hidden layer. In still other words, an activation map can be considered as a visualization of the behavior of the given hidden layer.

In some cases, a hidden layer of the deep learning model can respectively correspond to one activation map (e.g., a first activation map can display all of the outputted values of a first hidden layer, a second activation map can display all of the outputted values of a second hidden layer). In other cases, however, a hidden layer of the deep learning model can respectively correspond to a plurality of activation maps. For example, if the deep learning model is a convolutional neural network, a particular hidden layer can include a plurality of filters/kernels, and each filter/kernel of the particular hidden layer can be associated with its own corresponding activation map (e.g., a first filter/kernel of the particular hidden layer can be convolved, thereby yielding a first activation map corresponding to the particular hidden layer; a second filter/kernel of the particular hidden layer can be convolved, thereby yielding a second activation map corresponding to the particular hidden layer).

The inventors of various embodiments of the subject innovation recognized that a deep learning model can be considered as suitable for deployment on a target dataset if activation maps of the deep learning model that result from being fed samples from the target dataset are similar to activation maps of the deep learning model that result from being fed samples from the training dataset. For instance, the hidden layers of the deep learning model can behave in a certain way when the deep learning model analyzes inputs from the training dataset. If the hidden layers of the deep learning model behave similarly to that certain way when the deep learning model analyzes inputs from the target dataset, it can be inferred that the deep learning model is suitable for deployment on the target dataset. That is, it can be inferred that the deep learning model is agnostic to the differences between the training dataset and the target dataset. In such case, the deep learning model can be deployed on the target dataset without additional training. On the other hand, if the hidden layers of the deep learning model do not behave similarly to that certain way when the deep learning model analyzes inputs from the target dataset, it can be inferred that the deep learning model is not suitable for deployment on the target dataset. That is, it can be inferred that the deep learning model is not agnostic to the differences between the training dataset and the target dataset. In such case, the deep learning model can be slated for additional training before being deployed on the target dataset.

The computerized tool described herein can analyze activations maps as follows. In various cases, the computerized tool can be operatively coupled (e.g., via any suitable wired and/or wireless electronic connection) to a deep learning model, to a training dataset on which the deep learning model was trained, and to a target dataset that differs in some respect (e.g., in terms of demographics and/or modality) from the training dataset and on which it is desired to deploy the deep learning model.

In various cases, the computerized tool can select any suitable number of samples from the training dataset; these can be referred to as training samples. In various instances, the computerized tool can feed the selected training samples to the deep learning model, and the computerized tool can obtain activation maps (e.g., arrays of activation values) of the hidden layers of the deep learning model. Since these activation maps are generated in response to the training samples, these can be referred to as training activation maps.

In various aspects, the computerized tool can train a generative adversarial network on the training activation maps. As those having ordinary skill in the art will appreciate, a generative adversarial network (GAN) can learn a data distribution/pattern, so as to synthesize new data that complies with the learned data distribution/pattern. More specifically, a GAN can comprise a first neural network known as a generator and a second neural network known as a discriminator. In various cases, the generator can be configured to receive as input a random scalar and/or vector, and to produce as output a synthetic data candidate that mimics a particular data distribution/pattern. In various instances, the discriminator can be configured to receive as input a data candidate, and to produce as output a determination as to whether the inputted data candidate is genuine or fake (e.g., a data candidate synthesized by the generator can be considered as fake). Thus, the generator and the discriminator can be considered as adversaries, where the goal of the generator is to fool the discriminator (e.g., the generator synthesizes candidates to closely match a desired distribution/pattern, and the discriminator evaluates candidates to determine whether they are genuine). In various embodiments of the subject innovation, the generator can be configured to synthesize activation maps that mimic the distributions/patterns of the training activation maps produced by the deep learning model. Moreover, in various instances, the discriminator can be configured to receive as input activation maps, and to produce as output a determination as to whether the inputted activation maps are genuine (e.g., come from the deep learning model) or fake (e.g., come from the generator). Once training of the GAN is complete, the generator can have learned and/or abstracted the distributions/patterns of the training activation maps, such that the generator can be able to synthesize activation maps that closely resemble the training activation maps of the deep learning model.

In various instances, the computerized tool can select any suitable number of samples from the target dataset; these can be referred to as target samples. In various cases, the number of target samples can be different from the number of training samples. In various aspects, the computerized tool can feed the selected target samples to the deep learning model, and the computerized tool can obtain activation maps (e.g., arrays of activation values) of the hidden layers of the deep learning model. Since these activation maps are generated in response to the target samples, these can be referred to as target activation maps.

In various embodiments, for each target sample, the computerized tool can cause the generator to generate synthetic activation maps that closely match the target activation maps corresponding to that target sample. Specifically, for each target sample, the computerized tool can feed a random input vector to the generator, which can cause the generator to generate synthetic activation maps. In various aspects, the computerized tool can compute Euclidean distances between the synthetic activation maps and the target activation maps for that target sample. In various cases, the computerized tool can iteratively perturb the random input vector until the Euclidean distances between the synthetic activation maps and the target activation maps for that target sample are collectively minimized (e.g., until the sum and/or average of those Euclidean distances is minimized). Thus, the result can be that a minimized collective Euclidean distance value can be computed for each target sample.

Once the computerized tool computes a minimized collective Euclidean distance value for each target sample, the computerized tool can aggregate such minimized collective Euclidean distance values over all the target samples via any suitable mathematical and/or statistical technique, and the computerized tool can compute the model suitability coefficient based on such aggregation. For example, the computerized tool can compute the average minimized collective Euclidean distance value across all the target samples and can compute a ratio between that average and a maximum possible Euclidean distance value. In some cases, when such ratio is large (e.g., within a threshold margin of 1), it can be determined that the average Euclidean distance value computed over all the target samples is close to its maximum possible value, meaning that the synthetic activation maps are quite different from the target activation maps across the target samples. In other cases, when such ratio is small (e.g., within a threshold margin of 0), it can be determined that the average Euclidean distance value computed over all the target samples is far from its maximum possible value, meaning that the synthetic activation maps are quite similar to the target activation maps across the target samples. So, in various cases, the value of this ratio can indicate whether or not the hidden layers of the deep learning model are treating the target samples in the same and/or similar way that they would treat the training samples, meaning that the value of this ratio can indicate the suitability of the deep learning model to be deployed on the target dataset. Thus, this ratio can be considered as the model suitability coefficient.

Various embodiments of the subject innovation can be employed to use hardware and/or software to solve problems that are highly technical in nature (e.g., to facilitate model suitability coefficients based on generative adversarial networks and/or activation maps), that are not abstract and that cannot be performed as a set of mental acts by a human. Further, some of the processes performed can be performed by a specialized computer (e.g., trained deep learning model, generative adversarial network comprising a generator and a discriminator) for carrying out defined tasks related to model suitability coefficients. For example, such defined tasks can include: accessing, by a device operatively coupled to a processor, a deep learning model that is trained on a training dataset; computing, by the device, a model suitability coefficient that indicates whether the deep learning model is suitable for deployment on a target dataset, based on analyzing activation maps associated with the deep learning model; training, by the device, a generative adversarial network (GAN) to model a distribution of training maps of the deep learning models, based on samples from the training dataset; generating, by the device, a set of target activation maps of the deep learning model, by feeding a set of samples from the target dataset to the deep learning model; causing, by the device, a generator of the GAN to generate a set of synthetic training activation maps from the distribution of training activation maps of the deep learning model; iteratively perturbing, by the device, inputs of the generator until distances between the set of synthetic training activation maps and the set of target activation maps are minimized; and aggregating, by the device, the minimized distances, wherein the model suitability coefficient is based on the aggregated minimized distances. Such defined tasks are not conventionally performed manually by humans. Moreover, neither the human mind nor a human with pen and paper can electronically access a deep learning model, electronically train a GAN to model a distribution of training activation maps of the deep learning model, electronically generate target activation maps of the deep learning model, electronically generate synthetic training activation maps by executing a generator of the GAN, electronically and iteratively perturb an input of the generator until Euclidean distances between the synthetic training activation maps and the target activation maps are minimized, and electronically compute the model suitability coefficient by aggregating the minimized Euclidean distances. Instead, various embodiments of the subject innovation are inherently and inextricably tied to computer technology and cannot be implemented outside of a computing environment (e.g., embodiments of the subject innovation constitute a computerized device that automatically evaluates activation maps of a deep learning model via a GAN so as to determine whether the deep learning model is suitable for deployment on a target dataset; such a computerized device cannot be practicably implemented in any sensible way outside of a computing environment).

In various instances, embodiments of the invention can integrate into a practical application the disclosed teachings regarding model suitability coefficients based on generative adversarial networks and/or activation maps. Indeed, in various embodiments, the disclosed teachings can provide a computerized system that electronically accesses a deep learning model, a training dataset on which the deep learning model was trained, and a target dataset on which it is desired to deploy the deep learning model. In various cases, the computerized system can feed samples from the training dataset to the deep learning model to obtain training activation maps, can train a GAN to learn/abstract the distributions/patterns of the training activation maps, can feed samples from the target dataset to the deep learning model to obtain target activation maps, can cause the generator of the GAN to generate synthetic training activation maps that match the target activation maps as closely as the learned distribution/pattern allows, can compute Euclidean distances between the synthetic training activation maps and the target activation maps, and can aggregate the computed Euclidean distances to compute a model suitability coefficient that indicates whether the deep learning model is suitable for deployment on the target dataset. Thus, the computerized system can automatically determine whether the deep learning model can be deployed without change on the target dataset or whether the deep learning model instead requires additional training before deployment on the target dataset. In this way, certain disadvantageous situations can be avoided (e.g., deployment when the deep learning model is not suitable can result in suboptimal performance of the deep learning model; additional training when the deep learning model is already suitable can waste time and/or resources). Moreover, once the generator of the GAN is trained to generate synthetic training activation maps, any suitable number of model suitability coefficients can be computed for any suitable number of target datasets without having to reconsider and/or otherwise re-evaluate the training dataset and/or the genuine training activation maps. Thus, after training the GAN, the training dataset and/or the genuine training activation maps can be archived and/or deleted as desired, which can be an additional benefit of various embodiments of the subject innovation. In various cases, a computerized system as described herein can be considered as a diagnostic tool that evaluates the suitability of a deep learning model for deployment on a target dataset and is thus clearly a useful and practical application of computers.

Moreover, various embodiments of the invention can provide technical improvements to and solve problems that arise in the field of deep learning models. As explained above, the performance of a deep learning model is strongly tied to the training dataset on which the deep learning model was trained. Due to practical limitations, the training dataset can be unable to represent the full range of input variations and/or background features toward which the deep learning model is desired to be agnostic. Thus, when a target dataset differs in some demographic-based and/or modality-based respect from the training dataset, it can be the case that the deep learning model is not able to accurately analyze samples from the target dataset. Additional training (e.g., on the target dataset) can address such inaccuracy. However, such training can be a waste of time and/or resources if the deep learning model is able to accurately analyze samples from the target dataset despite the demographic-based and/or modality-based differences (e.g., such training can be unnecessary when the deep learning model is already agnostic to such differences). Embodiments of the subject innovation address these technical problems by providing a computerized tool that can automatically evaluate, via a GAN, the activation maps of the deep learning model to determine whether the deep learning model is suitable for deployment on the target dataset. Moreover, such a computerized tool can be applied to any suitable deep learning model; that is, the computerized tool is independent of the deep learning model and/or does not work only for certain types and/or styles of deep learning models. Embodiments of the subject innovation thus constitute a concrete technical improvement.

Furthermore, various embodiments of the subject innovation can control real-world devices based on the disclosed teachings. For example, a trained deep learning model is a concrete and tangible combination of computer hardware and/or computer software. In various cases, embodiments of the subject innovation can electronically access such a trained deep learning model, can electronically analyze activation maps of the trained deep learning model by executing a GAN (which is also a concrete and tangible combination of computer hardware and/or computer software), and can compute a model suitability coefficient that indicates whether the trained deep learning model is suitable for deployment on a real-world target dataset. In various cases, embodiments of the subject innovation can display/render the computed model suitability coefficient on any suitable computer screen/monitor. In various aspects, embodiments of the subject innovation can control operation/execution of the deep learning model based on the model suitability coefficient. For instance, in some cases, embodiments of the subject innovation can actually execute and/or cause to be executed the deep learning model on the target dataset if the model suitability coefficient satisfies a threshold. On the other hand, embodiments of the subject innovation can prevent the execution of the deep learning model on the target dataset if the model suitability coefficient does not satisfy the threshold. In some cases, if the model suitability coefficient does not satisfy the threshold, embodiments of the subject innovation can transmit an electronic message to a device associated with an operator of the deep learning model to schedule and/or procure additional training. In some cases, if the model suitability coefficient does not satisfy the threshold, embodiments of the subject innovation can train the deep learning model on the target dataset.

It should be appreciated that the herein figures are exemplary and non-limiting.

FIG. 1 illustrates a block diagram of an example, non-limiting system 100 that can facilitate model suitability coefficients based on generative adversarial networks and/or activation maps in accordance with one or more embodiments described herein. As shown, a model suitability system 102 can be operatively coupled, via any suitable wired and/or wireless electronic connections, to a deep learning model 104, to a training dataset 106, and to a target dataset 108. In various aspects, the deep learning model 104 can exhibit any suitable type and/or size of deep learning architecture (e.g., can be a neural network having any suitable number of layers and/or neurons with any suitable number of inter-neuron connections and with any suitable activation functions). As explained herein, the deep learning model 104 can, in some cases, have an input layer, any suitable number of hidden layers, and an output layer. In various aspects, the training dataset 106 can be a collection and/or population of data on which the deep learning model 104 has been trained (e.g., via supervised training, unsupervised training, and/or reinforcement learning). In various instances, the target dataset 108 can be a collection and/or population of data on which it is desired to deploy the deep learning model 104. In various cases, it is to be appreciated that the training dataset 106 and/or the target dataset 108 can be electronically stored in any suitable data structure and/or in any suitable centralized and/or decentralized formats. In various aspects, annotations for the training dataset 106 and/or for the target dataset 108 can be not needed.

In various cases, the target dataset 108 can differ and/or vary from the training dataset 106. For example, the target dataset 108 can represent different demographics (e.g., ethnicity, age, gender, co-morbidities) than the training dataset 106, and/or the target dataset 108 can represent different device modalities (e.g., data captured/generated via different types of scanners and/or protocols) than the training dataset 106. In various cases, it can be desired for the deep learning model 104 to be agnostic to the differences and/or variations between the training dataset 106 and the target dataset 108. For instance, suppose that the deep learning model 104 is configured to receive as input a computed tomography angiogram (CTA) image of a patient's brain and to generate as output a determination as to whether there is a large vessel occlusion in the patient's brain. In such case, it can be desired for the deep learning model 104 to produce accurate results for not just male patients but also female patients (e.g., agnostic to patient gender), for not just geriatric patients but also pediatric patients (e.g., agnostic to patient age), for not just healthy patients but also for patients with co-morbidities (e.g., agnostic to co-morbidity), for not just CTA images produced via a particular protocol but also for CTA images produced via other protocols (e.g., agnostic to device modality), and/or so on. Thus, due to practical limitations, it can be the case the target dataset 108 includes input variations that were not encompassed and/or represented in the training dataset 106. As explained herein, the model suitability system 102 can evaluate, via a generative adversarial network, activation maps of the deep learning model 104 in order to determine whether the deep learning model 104 is suitable for deployment on the target dataset 108, despite such input variations.

In various embodiments, the model suitability system 102 can comprise a processor 110 (e.g., computer processing unit, microprocessor) and a computer-readable memory 112 that is operably and/or operatively and/or communicatively connected/coupled to the processor 110. The memory 112 can store computer-executable instructions which, upon execution by the processor 110, can cause the processor 110 and/or other components of the model suitability system 102 (e.g., training activation map component 114, target activation map component 116, distance component 118, coefficient component 120) to perform one or more acts. In various embodiments, the memory 112 can store computer-executable components (e.g., training activation map component 114, target activation map component 116, distance component 118, coefficient component 120), and the processor 110 can execute the computer-executable components.

In various embodiments, the model suitability system 102 can comprise a training activation map component 114. In various aspects, the training activation map component 114 can electronically retrieve any suitable number of samples from the training dataset 106; these can be referred to as training samples. In various instances, the training activation map component 114 can electronically input and/or feed the training samples to the deep learning model 104. That is, the training activation map component 114 can cause the deep learning model 104 to be executed on the training samples. In various cases, for each training sample, the training activation map component 114 can electronically obtain from the deep learning model 104 activation maps of the hidden layers of the deep learning model 104. As explained above, an activation map can be an array of any suitable dimensionality that contains and/or lists some and/or all of the outputted activation values of a corresponding hidden layer of the deep learning model 104. Thus, an activation map for a given hidden layer can be obtained by electronically calling and/or retrieving some and/or all of the outputted activation values of the given hidden layer. The result can be that the training activation map component 114 obtains activation maps for each training sample; these can be referred to as training activation maps.

In various embodiments, the training activation map component 114 can comprise a generative adversarial network (GAN). As explained above, a GAN can include two neural networks: a generator that synthesizes data candidates according to a given distribution/pattern, and a discriminator that determines whether a data candidate is genuine (e.g., from the given distribution/pattern) or fake (e.g., from the generator). In various cases, the training activation map component 114 can train the GAN on the training activation maps, such that the GAN learns, models, and/or otherwise abstracts the distributions/patterns of values that are exhibited by the training activation maps. In other words, the generator can be trained to receive as input a random input vector and to synthesize as output fake activation maps that mimic (e.g., look like) the training activation maps, and the discriminator can be trained to receive as input activation maps and to generate as output a determination as to whether the inputted activation maps are genuine or fake.

In various embodiments, the model suitability system 102 can comprise a target activation map component 116. In various cases, the target activation map component 116 can electronically retrieve any suitable number of samples from the target dataset 108; these can be referred to as target samples. In various cases, the number of target samples can be different from the number of training samples. In various instances, the target activation map component 116 can electronically input and/or feed the target samples to the deep learning model 104. That is, the target activation map component 116 can cause the deep learning model 104 to be executed on the target samples. In various cases, for each target sample, the target activation map component 116 can electronically obtain from the deep learning model 104 activation maps of the hidden layers of the deep learning model 104. As mentioned above, an activation map for a given hidden layer can be obtained by electronically calling and/or retrieving some and/or all of the outputted activation values of the given hidden layer. The result can be that the target activation map component 116 obtains activation maps for each target sample; these can be referred to as target activation maps.

In various embodiments, the model suitability system 102 can comprise a distance component 118. In various aspects, for each target sample, the training activation map component 114 can electronically input and/or feed to the generator of the GAN a random input vector, which can cause the generator to produce synthetic training activation maps that comply with the distributions/patterns exhibited by the genuine training activation maps. In various instances, for each target sample, the distance component 118 can electronically calculate Euclidean distances between the synthetic training activation maps and the target activation maps corresponding to that target sample. In various aspects, the training activation map component 114 can iteratively perturb the random input vector until the Euclidean distances calculated by the distance component 118 are collectively minimized (e.g., until the synthetic training activation maps are as close as they can be to the target activation maps while simultaneously complying with the distributions/patterns exhibited by the training activation maps). In various aspects, the training activation map component 114 and the distance component 118 can repeat this process for each target sample, thereby yielding a set of collectively minimized Euclidean distances.

In various embodiments, the model suitability system 102 can comprise a coefficient component 120. In various aspects, the coefficient component 120 can electronically compute a model suitability coefficient based on the set of collectively minimized Euclidean distances. In some cases, the coefficient component 120 can take the average of the set of collectively minimized Euclidean distances and can divide that average by a maximum possible Euclidean distance. The resulting ratio can be considered as the model suitability coefficient. In such case, if the model suitability coefficient is close (e.g., within any suitable threshold margin) to the value 1, this can indicate that the target activation maps are quite different from the synthetic training activation maps. In other words, this can indicate that the hidden layers of the deep learning model 104 are treating the target dataset 108 significantly differently than the training dataset 106. Thus, the deep learning model 104 can be considered as not suitable for deployment on the target dataset 108. On the other hand, if the model suitability coefficient is close to the value 0, this can indicate that the target activation maps are quite similar to the synthetic training activation maps. In other words, this can indicate that the hidden layers of the deep learning model 104 are treating the target dataset 108 very similarly as the training dataset 106. Thus, the deep learning model 104 can be considered as suitable for deployment on the target dataset 108.

Those having ordinary skill in the art will appreciate that the above ratio is merely one non-limiting example of a model suitability coefficient. In various aspects, the collectively minimized Euclidean distances computed by the distance component 118 can be mathematically and/or statistically utilized and/or manipulated in any suitable fashion so as to quantify a level of similarity and/or dissimilarity between the target activation maps and the synthetic training activation maps. In other words, any suitable mathematical formula can be used to convert the collectively minimized Euclidean distances to a model suitability coefficient.

Figure 2:
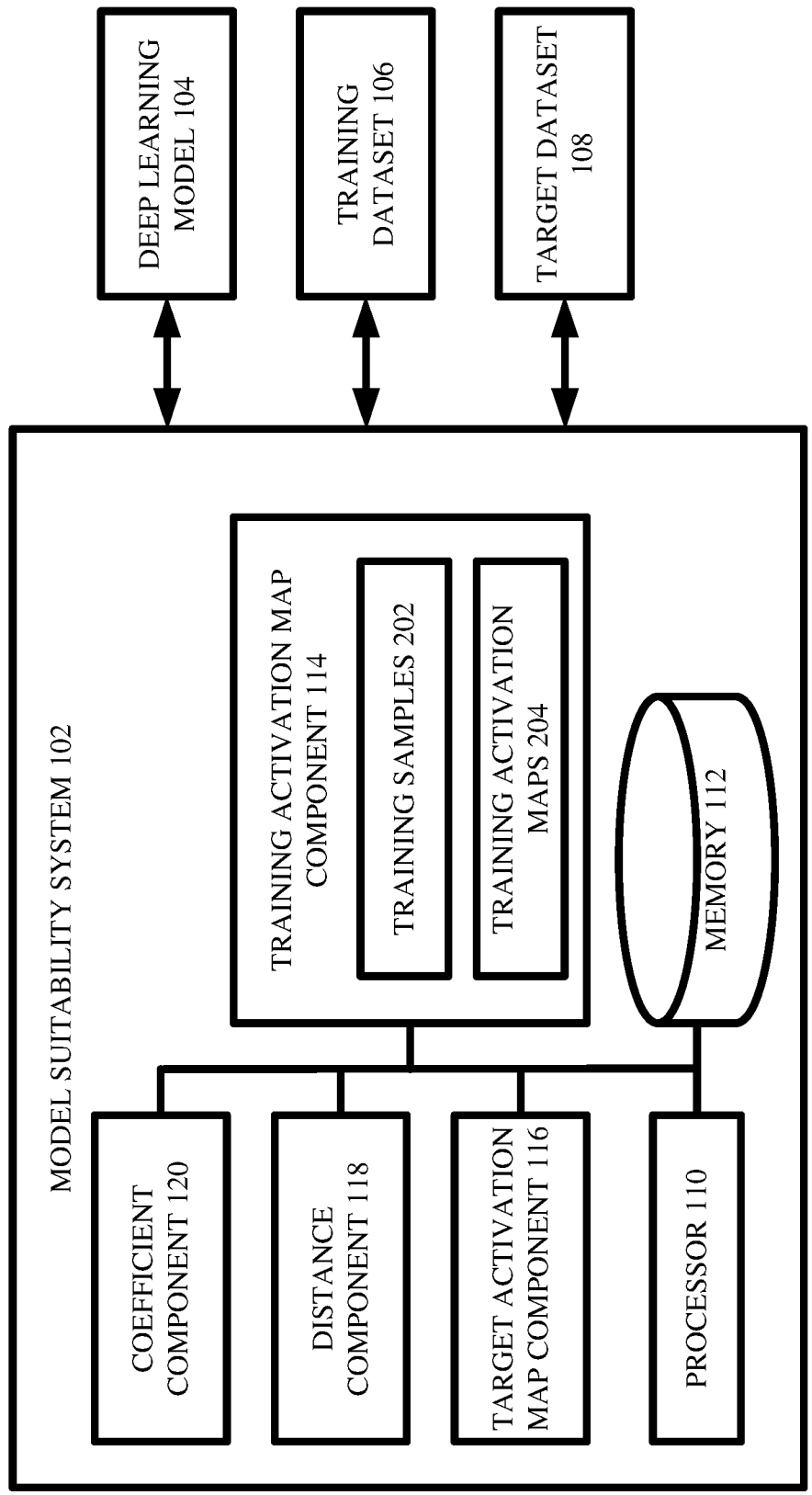
FIG. 2 illustrates a block diagram of an example, non-limiting system including training activation maps that facilitates model suitability coefficients based on generative adversarial networks and activation maps in accordance with one or more embodiments described herein.

FIG. 2 illustrates a block diagram of an example, non-limiting system 200 including training activation maps that can facilitate model suitability coefficients based on generative adversarial networks and activation maps in accordance with one or more embodiments described herein. As shown, the system 200 can, in some cases, comprise the same components as the system 100, and can further comprise training samples 202 and training activation maps 204.

In various instances, the training activation map component 114 can electronically retrieve training samples 202 from the training dataset 106. In various aspects, the training samples 202 can have any suitable cardinality. That is, there can be any suitable number of samples in the training samples 202. In various cases, the training samples 202 can be chosen from the training dataset 106 at random and/or in any other suitable fashion.

In various instances, the training activation map component 114 can electronically input and/or feed the training samples 202 to the deep learning model 104, such that the deep learning model 104 executes on the training samples 202 (e.g., executes on each of the training samples 202 independently). In various cases, for each of the training samples 202, the deep learning model 104 can generate a set of training activation maps (e.g., for each of the training samples 202, there can be a number of training activation maps that is greater than or equal to the number of hidden layers of the deep learning model 104). These can be collectively referred to as training activation maps 204. As mentioned above, for each of the training samples 202, the training activation map component 114 can electronically call and/or retrieve the outputted activation values of the hidden layers of the deep learning model 104, thereby collectively yielding the training activation maps 204.

Figure 3:
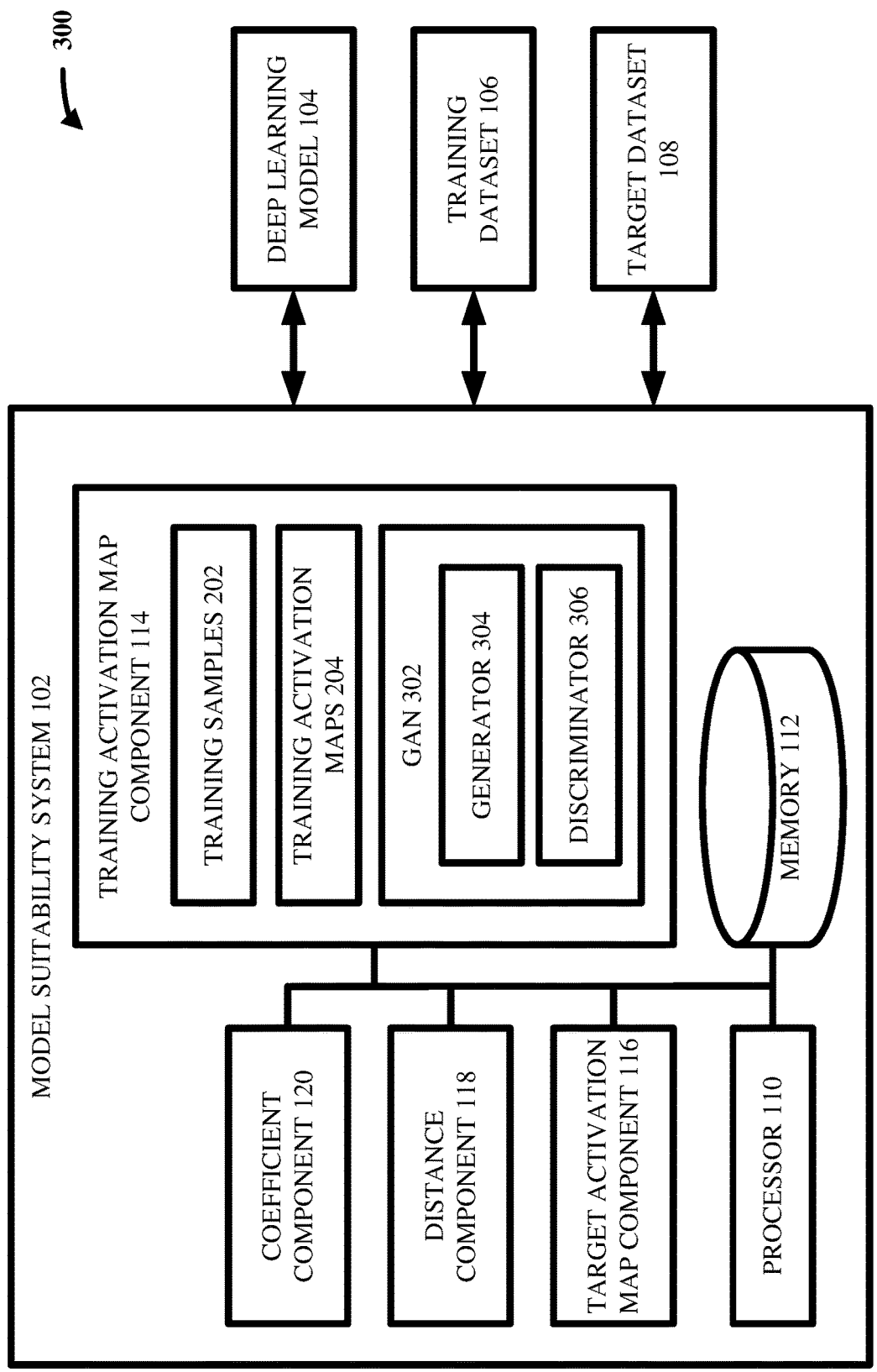
FIG. 3 illustrates a block diagram of an example, non-limiting system including a generative adversarial network that facilitates model suitability coefficients based on generative adversarial networks and activation maps in accordance with one or more embodiments described herein.

FIG. 3 illustrates a block diagram of an example, non-limiting system 300 including a generative adversarial network that can facilitate model suitability coefficients based on generative adversarial networks and activation maps in accordance with one or more embodiments described herein. As shown, the system 300 can, in some cases, comprise the same components as the system 200, and can further comprise a generative adversarial network (GAN) 302.

In various embodiments, the training activation map component 114 can comprise the GAN 302, which can include a generator 304 and a discriminator 306. As explained above, the GAN 302 can learn to model and/or emulate data distributions/patterns. In various aspects, the generator 304 and the discriminator 306 can both be neural networks having any suitable types and/or sizes of architectures (e.g., any suitable number of neurons and/or layers, any suitable number of connections, any suitable activation functions). In various instances, the generator 304 can be configured to receive as input a random input vector and to synthesize as output fake activation maps that mimic the value distributions/patterns exhibited by the training activation maps 204. In various cases, changing the random input vector can change the fake activation maps synthesized by the generator 304. In various aspects, the discriminator 306 can be configured to receive as input activation maps and to determine as output whether the inputted activation maps are genuine (e.g., are from the training activation maps 204) or fake (e.g., are synthesized by the generator 304). In various cases, the generator 304 and the discriminator 306 can be considered as having opposite goals (e.g., the generator 304 is trying to fool the discriminator 306).

As those having ordinary skill in the art will appreciate, the GAN 302 can be trained in an iterative and adversarial style as follows. The parameters (e.g., weights, biases) of the generator 304 and the discriminator 306 can be randomly initialized. In various cases, the discriminator 306 can be fed some of the training activation maps 204 that correspond to one of the training samples 202, can determine whether or not they are genuine, and can be updated via backpropagation. In various instances, the generator 304 can be fed a random input vector and can synthesize fake activation maps based on the random input vector. The discriminator 306 can then be fed the fake activation maps and can determine whether or not they are genuine. In various cases, both the generator 304 and the discriminator 306 can then be updated via backpropagation based on the determination of the discriminator 306 (e.g., the loss of the generator 304 can be defined in terms of the loss of the discriminator 306, since the generator 304 and the discriminator 306 have opposite goals). This training process can then be repeated for all of the training samples 202. In this way, the generator 304 can be indirectly trained to model and/or emulate the distributions/patterns exhibited by the training activation maps 204 (e.g., the generator 304 can be trained to produce synthetic activation maps that look like and/or are consistent with the training activation maps 204).

Figure 4:
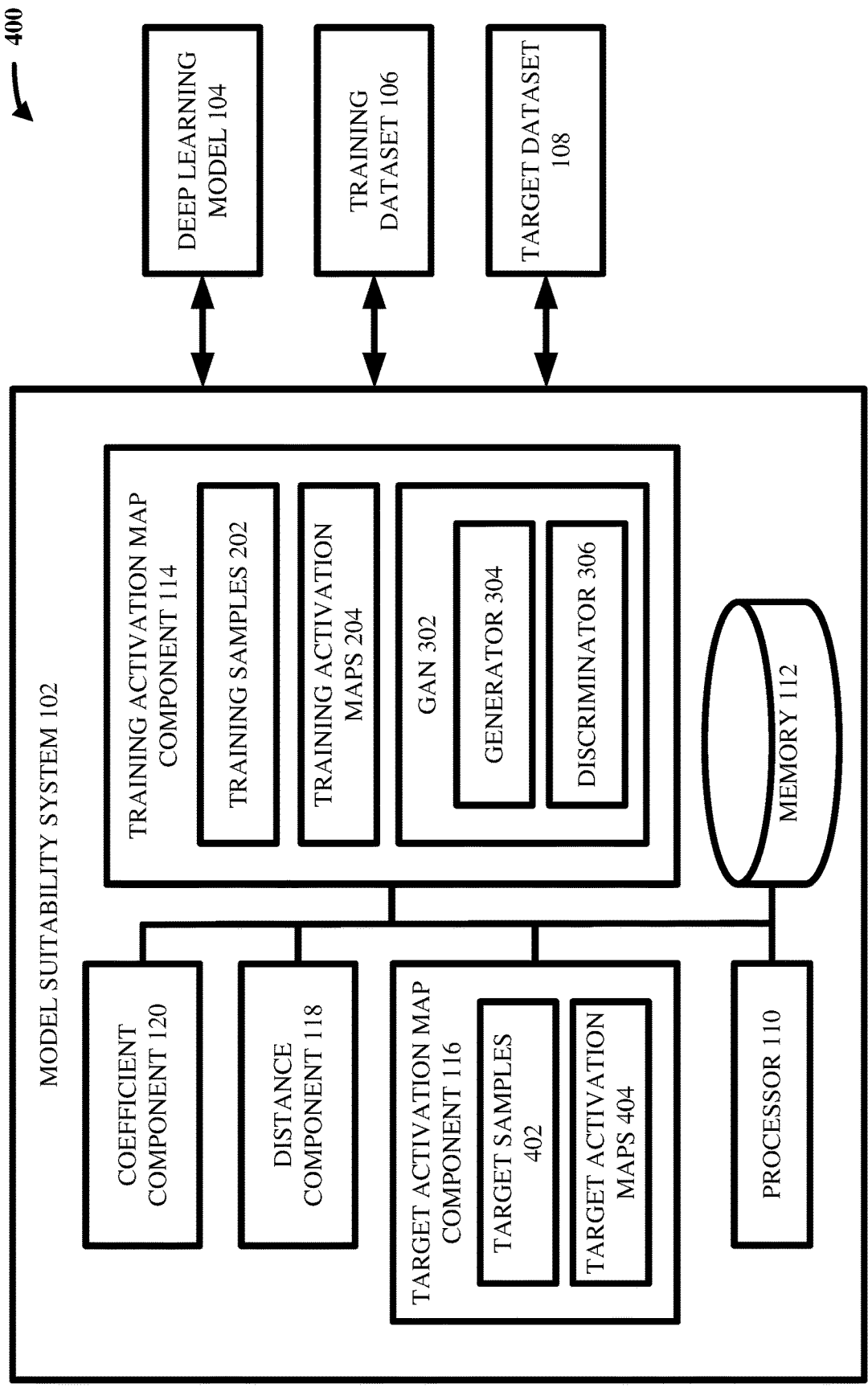
FIG. 4 illustrates a block diagram of an example, non-limiting system including target activation maps that facilitates model suitability coefficients based on generative adversarial networks and activation maps in accordance with one or more embodiments described herein.

FIG. 4 illustrates a block diagram of an example, non-limiting system 400 including target activation maps that can facilitate model suitability coefficients based on generative adversarial networks and activation maps in accordance with one or more embodiments described herein. As shown, the system 400 can, in some cases, comprise the same components as the system 300, and can further comprise target samples 402 and target activation maps 404.

In various instances, the target activation map component 116 can electronically retrieve target samples 402 from the target dataset 108. In various aspects, the target samples 402 can have any suitable cardinality. That is, there can be any suitable number of samples in the target samples 402. In various cases, the cardinality of the target samples 402 can be different from the cardinality of the training samples 202. In various instances, the target samples 402 can be chosen from the target dataset 108 at random and/or in any other suitable fashion.

In various instances, the target activation map component 116 can electronically input and/or feed the target samples 402 to the deep learning model 104, such that the deep learning model 104 executes on the target samples 402 (e.g., executes on each of the target samples 402 independently). In various cases, for each of the target samples 402, the deep learning model 104 can generate a set of target activation maps (e.g., for each of the target samples 402, there can be a number of target activation maps that is greater than or equal to the number of hidden layers of the deep learning model 104). These can be collectively referred to as target activation maps 404. As mentioned above, for each of the target samples 402, the target activation map component 116 can electronically call and/or retrieve the outputted activation values of the hidden layers of the deep learning model 104, thereby collectively yielding the target activation maps 404.

Figure 5:
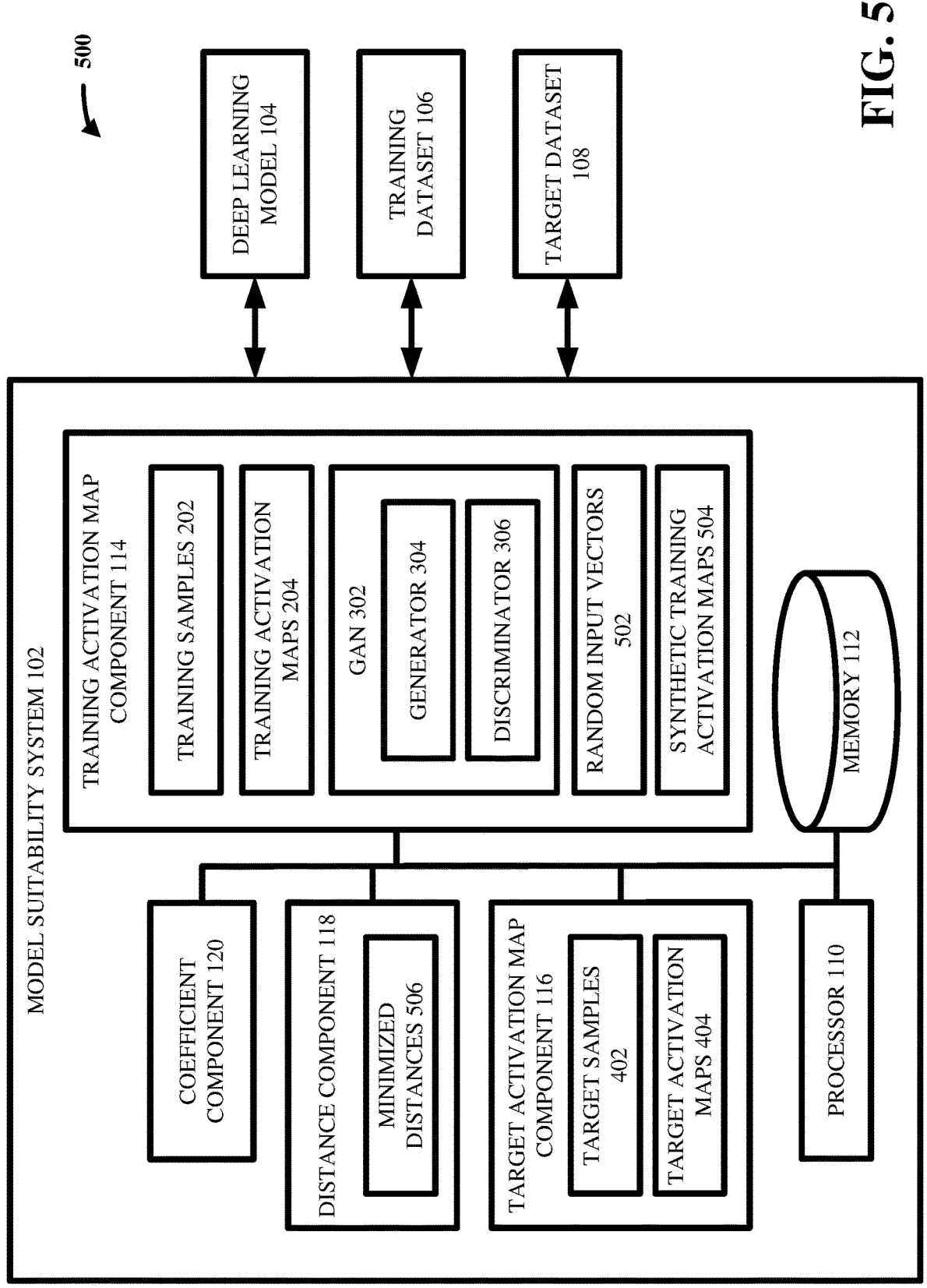
FIG. 5 illustrates a block diagram of an example, non-limiting system including synthetic training activation maps that facilitates model suitability coefficients based on generative adversarial networks and activation maps in accordance with one or more embodiments described herein.

FIG. 5 illustrates a block diagram of an example, non-limiting system 500 including synthetic training activation maps that can facilitate model suitability coefficients based on generative adversarial networks and activation maps in accordance with one or more embodiments described herein.

As shown, the system 500 can, in some cases, comprise the same components as the system 400, and can further comprise random input vectors 502, synthetic training activation maps 504, and/or minimized distances 506.

In various embodiments, the training activation map component 114 can generate random input vectors 502. In various cases, the random input vectors 502 can have any suitable cardinality (e.g., there can be any suitable number of vectors in the random input vectors 502). In some cases, the cardinality of the random input vectors 502 can be equal to the cardinality of the target samples 402 (e.g., the number of vectors in the random input vectors 502 can be equal to the number of samples in the target samples 402). In other words, the target samples 402 can respectively correspond to the random input vectors 502. In various cases, the random input vectors 502 can have any suitable dimensionality, such that the generator 304 can receive as input each of the random input vectors 502. That is, if the generator 304 accepts an x-element vector as input, each of the random input vectors 502 can have x elements, for any positive suitable integer x. In various cases, each of the random input vectors 502 can be randomly generated by the training activation map component 114.

In various instances, the training activation map component 114 can electronically input and/or feed each of the random input vectors 502 to the generator 304, which can cause the generator 304 to generate the synthetic training activation maps 504. That is, for each of the random input vectors 502, the generator 304 can synthesize a number of the synthetic training activation maps 504 that is greater than or equal to the number of hidden layers of the deep learning model 104. Because the random input vectors 502 can respectively correspond to the target samples 402, the synthetic training activation maps 504 can likewise respectively correspond to the target activation maps 404. In various cases, the synthetic training activation maps 504 can exhibit and/or come from the distributions/patterns of the training activation maps 204, which the generator 304 learned during training of the GAN 302.

In various aspects, the distance component 118 can electronically compute Euclidean distances between the synthetic training activation maps 504 and the target activation maps 404. The training activation map component 114 can iteratively perturb each of the random input vectors 502 until the Euclidean distances computed by the distance component 118 are minimized. The result can be the minimized distances 506. Once the minimized distances 506 are achieved, the synthetic training activation maps 504 can be considered as being as closely matched to the target activation maps 404 as the distributions/patterns of the training activation maps 204 will allow.

Figure 6:
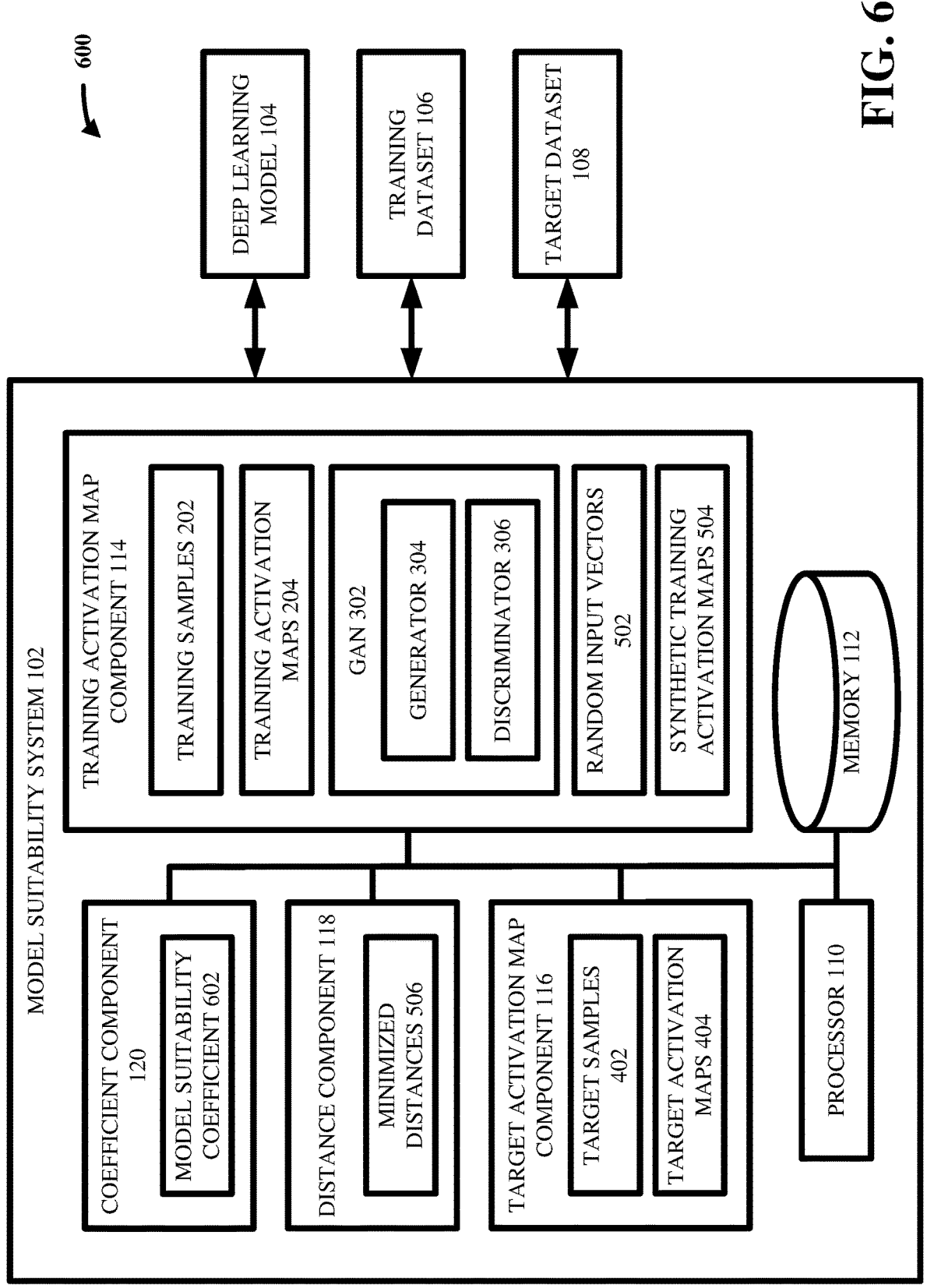
FIG. 6 illustrates a block diagram of an example, non-limiting system including a model suitability coefficient that facilitates model suitability coefficients based on generative adversarial networks and activation maps in accordance with one or more embodiments described herein.

FIG. 6 illustrates a block diagram of an example, non-limiting system 600 including a model suitability coefficient that can facilitate model suitability coefficients based on generative adversarial networks and activation maps in accordance with one or more embodiments described herein. As shown, the system 600 can, in some cases, comprise the same components as the system 500, and can further comprise a model suitability coefficient 602.

In various embodiments, the coefficient component 120 can compute the model suitability coefficient 602 based on the minimized distances 506. In various aspects, the coefficient component 120 can utilize any suitable mathematical formula and/or statistical technique to compute the model suitability coefficient 602 based on the minimized distances 506. For example, in some cases, the coefficient component 120 can compute an average of the minimized distances 506 and can divide that average by a maximum possible distance value. The resulting ratio, which can indicate how the average minimized distance compares to the maximum possible distance value, can be considered as the model suitability coefficient 602 (e.g., the smaller the average distance as compared to the maximum possible distance value, the more similar the synthetic training activation maps 504 are to the target activation maps 404, and thus the more suitable the deep learning model 104 is to be deployed on the target dataset 108; the larger the average distance as compared to the maximum possible distance value, the less similar the synthetic training activation maps 504 are to the target activation maps 404, and thus the less suitable the deep learning model 104 is to be deployed on the target dataset 108). In various cases, the coefficient component 120 can compare the model suitability coefficient 602 to a threshold value, and can determine whether or not the deep learning model 104 is suitable to be deployed on the target dataset 108 based on whether the model suitability coefficient 602 is above and/or below the threshold value.

Although the above discussion treats the model suitability coefficient 602 as a scalar, this is a non-limiting example. Those having ordinary skill in the art will appreciate that the model suitability coefficient 602 can be a vector, a matrix, and/or a tensor, depending on how the minimized distances 506 are mathematically manipulated to compute the model suitability coefficient 602.

Figure 7:
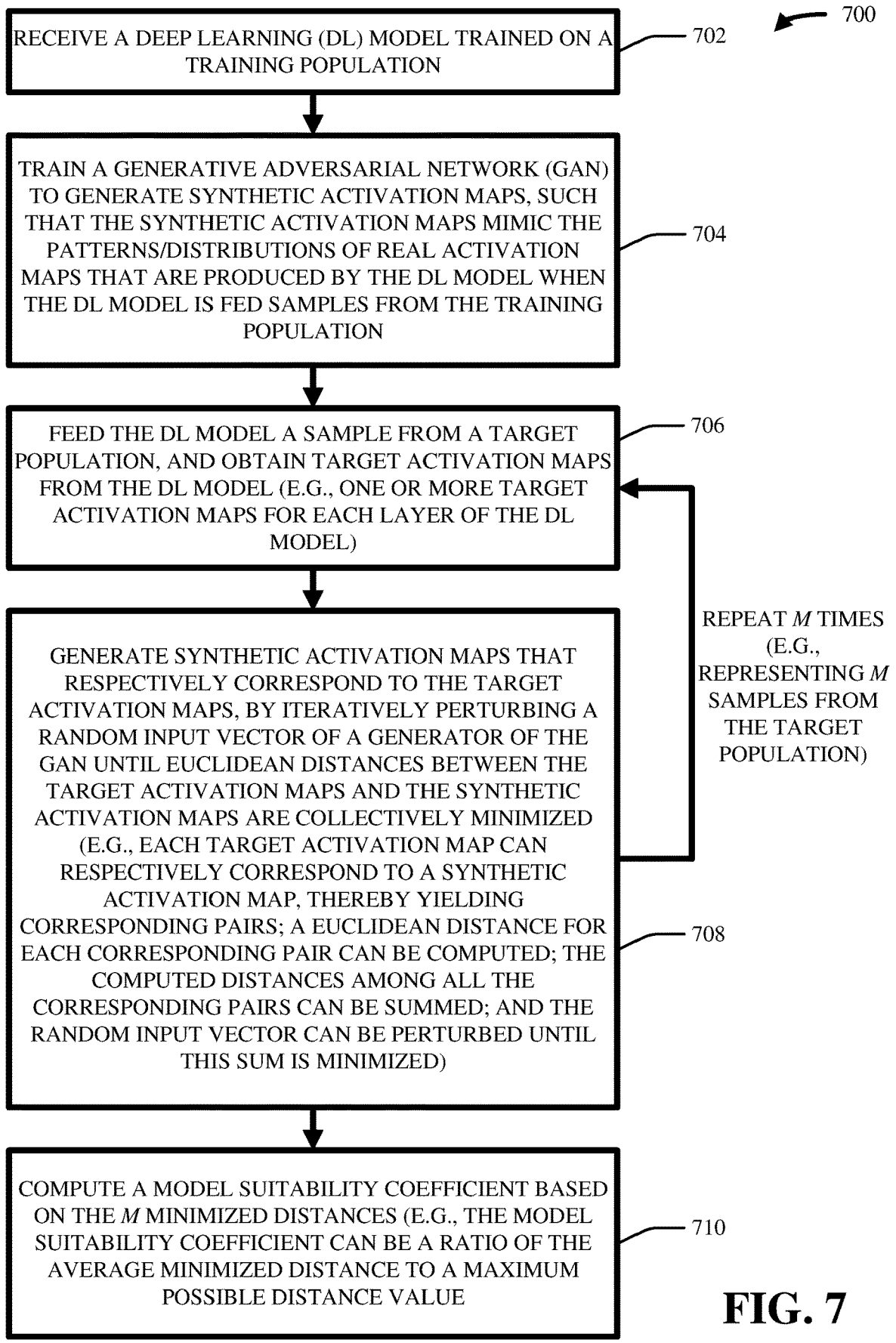
FIG. 7 illustrates a flow diagram of an example, non-limiting computer-implemented method that facilitates model suitability coefficients based on generative adversarial networks and activation maps in accordance with one or more embodiments described herein.

FIG. 7 illustrates a flow diagram of an example, non-limiting computer-implemented method 700 that can facilitate model suitability coefficients based on generative adversarial networks and activation maps in accordance with one or more embodiments described herein. In various cases, the systems 100-600 can facilitate execution of the computer-implemented method 700.

In various embodiments, act 702 can include receiving, by a device (e.g., 102) operatively coupled to a processor, a deep learning (DL) model (e.g., 104) that is trained on a training population (e.g., 106).

In various aspects, act 704 can include training, by the device (e.g., 114), a generative adversarial network (GAN) (e.g., 302) to generate synthetic activation maps, such that the synthetic activation maps mimic the patterns/distributions of real activation maps (e.g., 204) that are produced by the DL model when the DL model is fed samples (e.g., 202) from the training population.

In various instances, act 706 can include feeding, by the device (e.g., 116), the DL model a sample (e.g., one of 402) from a target population (e.g., 108), and obtaining, by the device (e.g., 116), target activation maps (e.g., some of 404) from the DL model. In various cases, for each sample from the target population, there can be one or more target activation maps from each layer of the DL model.

In various aspects, act 708 can include generating, by the device (e.g., 114), synthetic activation maps (e.g., some of 504) that respectively correspond to the target activation maps, by iteratively perturbing a random input vector (e.g., one of 502) of a generator (e.g., 304) of the GAN until Euclidean distances between the target activation maps and the synthetic activation maps are collectively minimized (e.g., 506). For example, each target activation map can respectively correspond to a synthetic activation map, thereby yielding corresponding pairs of activation maps. A Euclidean distance for each corresponding pair can be computed. In various cases, the computed Euclidean distances among all the corresponding pairs can be summed, and the random input vector can be perturbed until this sum is minimized.

As shown in FIG. 7, acts 706-708 can be repeated m times, where m can represent the number of samples taken from the target population.

In various cases, act 710 can comprise computing, by the device (e.g., 120), a model suitability coefficient (e.g., 602) based on the m minimized distances. For example, the model suitability coefficient can be a ratio of the average minimized distance to a maximum possible distance value. In various cases, any other suitable mathematical formula can be used to compute the model suitability coefficient based on the m minimized distances.

FIGS. 8-16 help to illustrate and/or clarify the above discussion.

Figure 8:
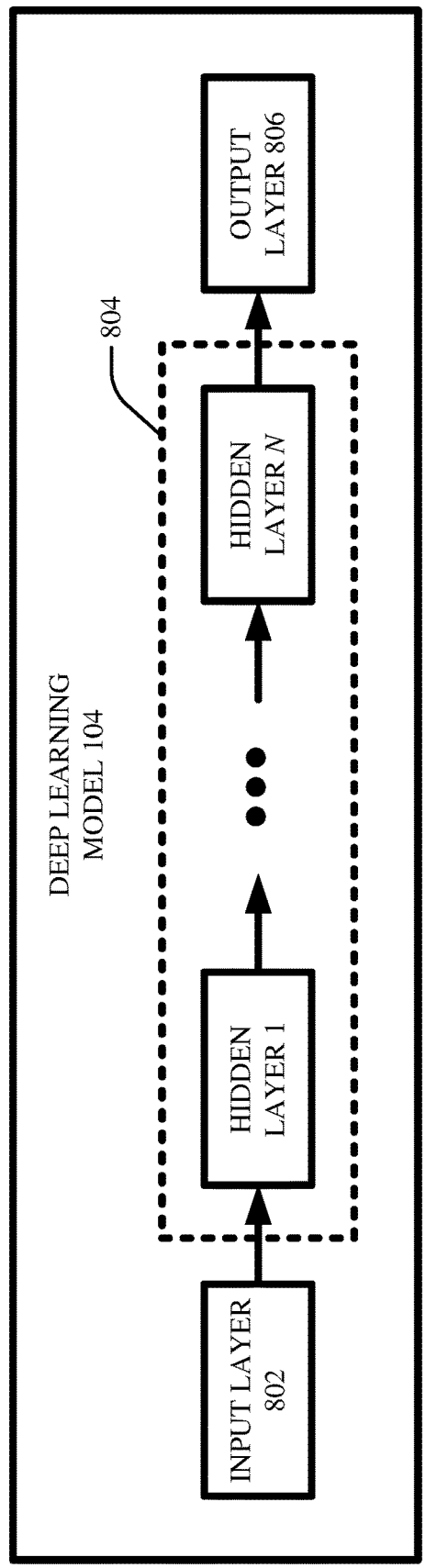
FIG. 8 illustrates a block diagram of an example, non-limiting deep learning model in accordance with one or more embodiments described herein.

FIG. 8 illustrates a block diagram of an example, non-limiting deep learning model in accordance with one or more embodiments described herein. In other words, FIG. 8 depicts an example and non-limiting embodiment of the deep learning model 104. As shown, the deep learning model 104 can, in some cases, comprise an input layer 802 having any suitable number of neurons, a set of hidden layers 804, and an output layer 806 having any suitable number of neurons. In various cases, the set of hidden layers 804 can include n hidden layers (e.g., hidden layer 1 to hidden layer n), for any suitable positive integer n. In various aspects, each of the set of hidden layers 804 can have any suitable number of neurons (e.g., different hidden layers can have different numbers of neurons).

Figure 9:
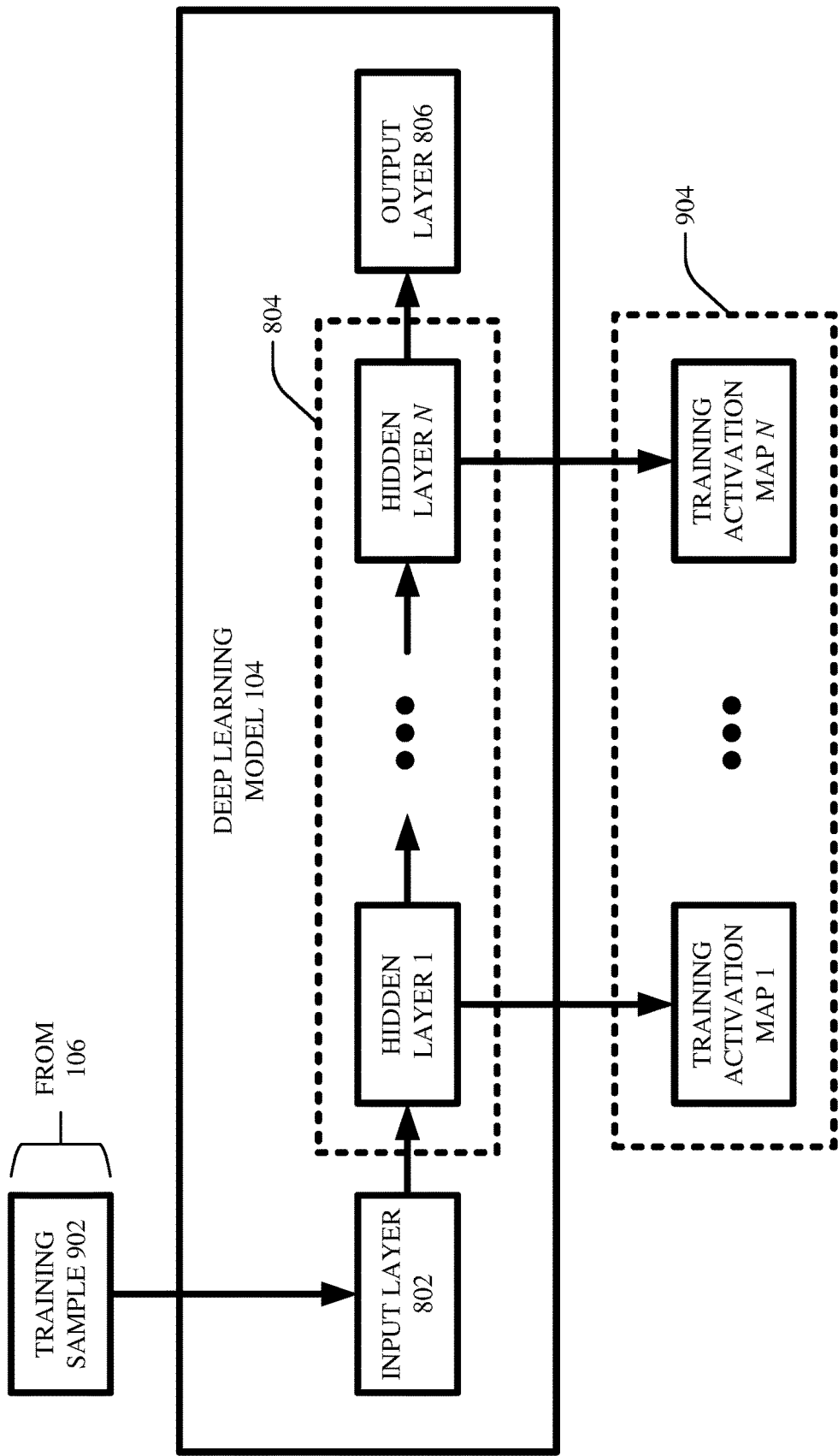
FIG. 9 illustrates a block diagram of example, non-limiting training activation maps of a deep learning model in accordance with one or more embodiments described herein.

FIG. 9 illustrates a block diagram of example, non-limiting training activation maps of a deep learning model in accordance with one or more embodiments described herein. As shown, a training sample 902, which can come from the training dataset 106, can be fed to the input layer 802 of the deep learning model 104. In various instances, the set of hidden layers 804 can then analyze the training sample 902 during a forward pass. For example, the neurons of the hidden layer 1 can compute linear combinations of input values from the input layer 802 based on weights and/or biases, can apply non-linear activation functions to those linear combinations, and can output the results of those non-linear activation functions to the neurons in a hidden layer 2. The remaining hidden layers can follow suit. At the end of the forward pass, the neurons of the output layer 806 can have computed values that correspond to a determination, inference, and/or prediction of the deep learning model 104.

As shown, during the forward pass, the set of hidden layers 804 can generate a set of training activation maps 904. Specifically, for each of the set of hidden layers 804, the results of the non-linear activation functions of that hidden layer can be considered as an activation map from that hidden layer. So, the results of the non-linear activation functions of the neurons in the hidden layer 1 can be considered as a training activation map 1, and the results of the non-linear activation functions of the neurons in the hidden layer n can be considered as a training activation map n. Thus, the set of training activation maps 904 can be considered as corresponding to the training sample 902 (e.g., when the deep learning model 104 receives the training sample 902, the set of training activation maps 904 can be obtained). In various aspects, the dimensionalities/sizes of each of the training activation maps 904 can be based on the number of neurons in each of the set of hidden layers 804, and thus such dimensionalities/sizes can differ for different training activation maps (e.g., the hidden layer 1 can have a different number of neurons than the hidden layer n, which means that the training activation map 1 can have a different dimensionality/size than the training activation map n).

As depicted, FIG. 9 shows that each hidden layer can have one corresponding activation map. In such case, the training sample 902 can thus correspond to and/or otherwise be associated with n training activation maps (e.g., one activation map per hidden layer). However, this is a non-limiting example. Those having ordinary skill in the art will appreciate that, in various cases, more than one activation map can correspond to any given hidden layer. For example, if the deep learning model 104 is a convolutional neural network, then each of the set of hidden layers 804 can comprise one or more filters/kernels, where the convolution of a filter/kernel during the forward pass yields one activation map (e.g., if the hidden layer 1 has 32 filters/kernels, then the hidden layer 1 would be associated with 32 activation maps; if the hidden layer n has 16 filters/kernels, then the hidden layer n would be associated with 16 activation maps). In such cases, the training sample 902 would thus correspond to and/or otherwise be associated with more than n training activation maps.

Figure 10:
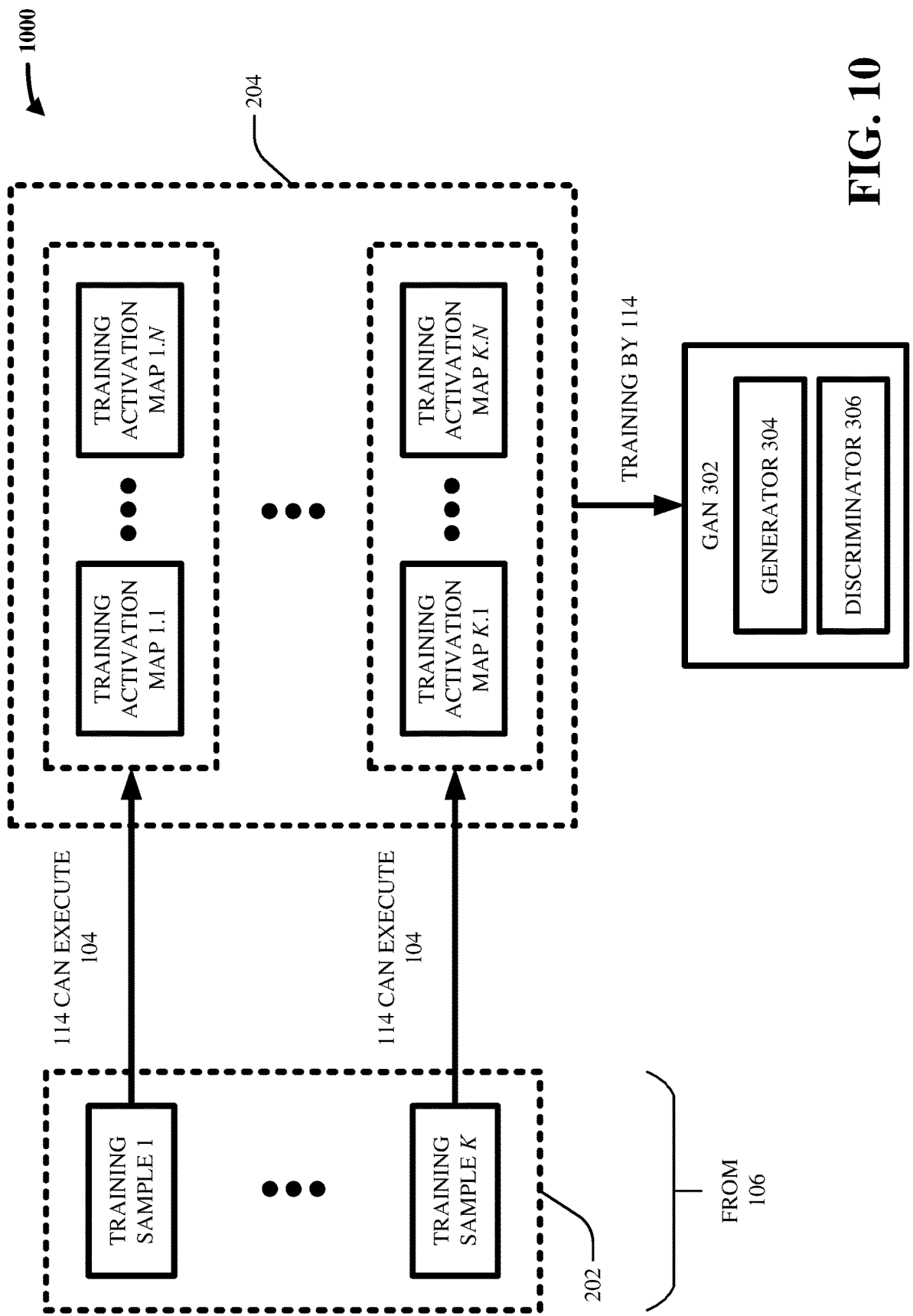
FIG. 10 illustrates a block diagram showing how example, non-limiting training activation maps can be used to train a generative adversarial network in accordance with one or more embodiments described herein.

FIG. 10 illustrates a block diagram showing how example, non-limiting training activation maps can be used to train a generative adversarial network in accordance with one or more embodiments described herein.

As shown, FIG. 10 illustrates example and non-limiting embodiments of the training samples 202 and the training activation maps 204. Specifically, the training activation map component 114 can select k samples from the training dataset 106, for any suitable positive integer k. Thus, there can be k samples in the training samples 202 (e.g., training sample 1 to training sample k). In various cases, the training activation map component 114 can independently feed each of the training samples 202 to the deep learning model 104, thereby yielding n training activation maps per training sample. Specifically, training activation map 1.1 to training activation map 1.n can correspond to the training sample 1, and training activation map k.1 to training activation map k.n can correspond to the training sample k. In other words, in this non-limiting example, there can be k times n training activation maps in the training activation maps 204 (e.g., k sets of n training activation maps, respectively corresponding to k training samples).

In various aspects, the training activation map component 114 can train the GAN 302 on the training activation maps 204. Specifically, the generator 304 can be configured to receive as input any suitably-sized random input vector and to synthesize as output n fake activation maps (e.g., one fake activation map per hidden layer in this non-limiting example). Moreover, the discriminator 306 can be configured to receive as input n activation maps and to determine as output whether the n inputted activation maps are genuine (e.g., from the training activation maps 204) or fake (e.g., synthesized by the generator 304). Thus, training of the GAN 302 can proceed as follows. The parameters of the generator 304 and the discriminator 306 can be randomly initialized. The discriminator 306 can be fed n activation maps from the training activation maps 204 that correspond to one of the k samples in the training samples 202 (e.g., the discriminator 306 can be fed the training activation map 1.1 to the training activation map 1.n, which correspond to the training sample 1). The discriminator 306 can determine whether the n training activation maps are genuine or fake. Since the n training activation maps are known to be genuine, the parameters of the discriminator 306 can be updated via backpropagation. In various cases, a random input vector can be fed to the generator 304, which can cause the generator 304 to generate n fake training activation maps. In various cases, the n fake training activation maps can be fed to the discriminator 306, and the discriminator 306 can determine whether the n fake training activation maps are genuine or fake. Since the n fake activation maps are known to be fake, the parameters of the discriminator 306 can again be updated via backpropagation. Moreover, the parameters of the generator 304 can be updated via backpropagation, since it is now known how well or how poorly the n fake training activation maps fooled the discriminator 306. This procedure can be repeated k times (e.g., for all k of the training samples 202). At the end of this procedure, the generator 304 can be able to synthesize fake activation maps that come from, exhibit, and/or mimic the distributions/patterns shown in the training activation maps 204 (e.g., the discriminator 306 can be unable to reliably distinguish the fake activation maps synthesized by the generator 304 from the training activation maps 204).

Figure 11:
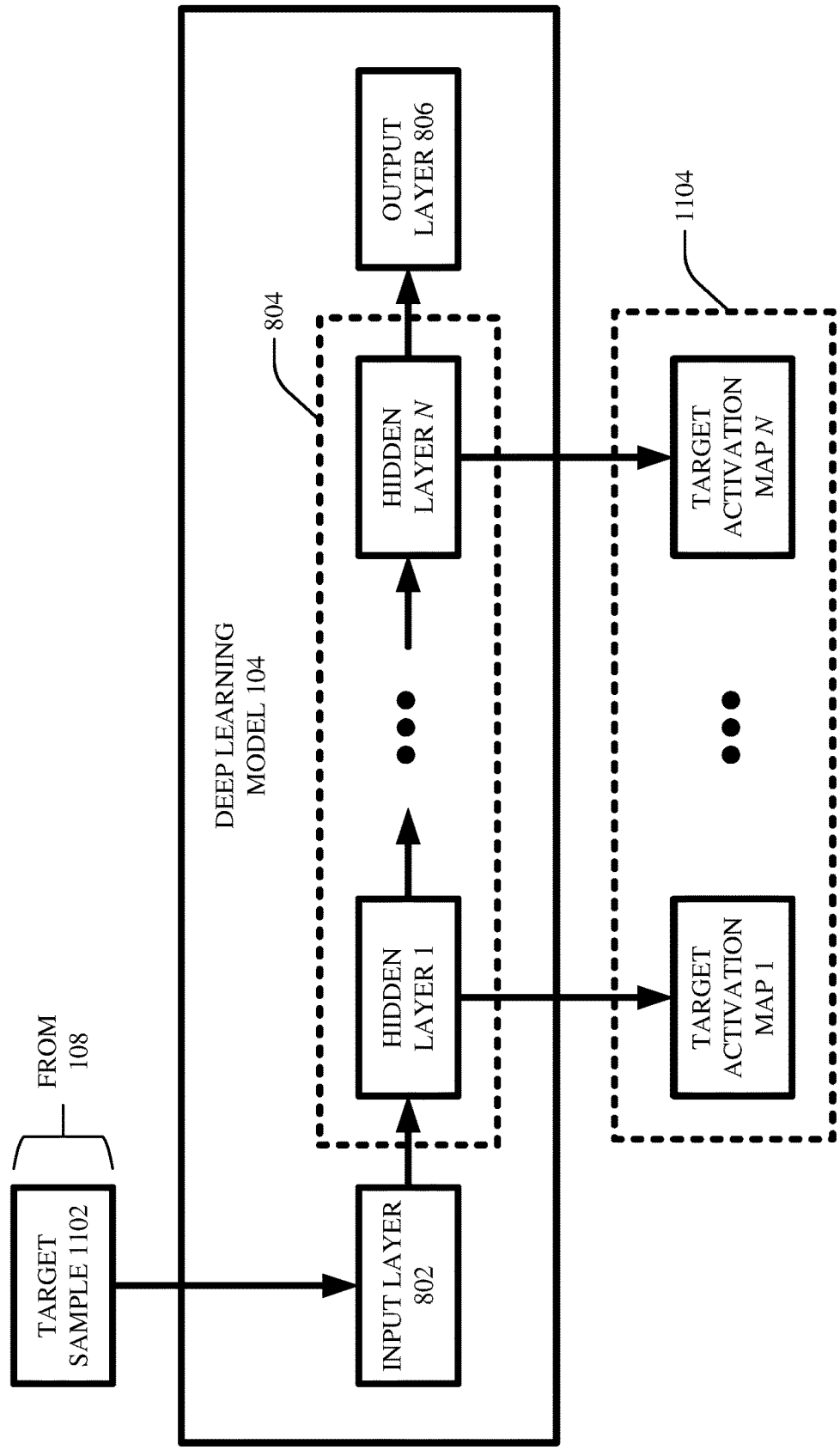
FIGS. 11-12 illustrate block diagrams of example, non-limiting target activation maps of a deep learning model in accordance with one or more embodiments described herein.
Figure 12:
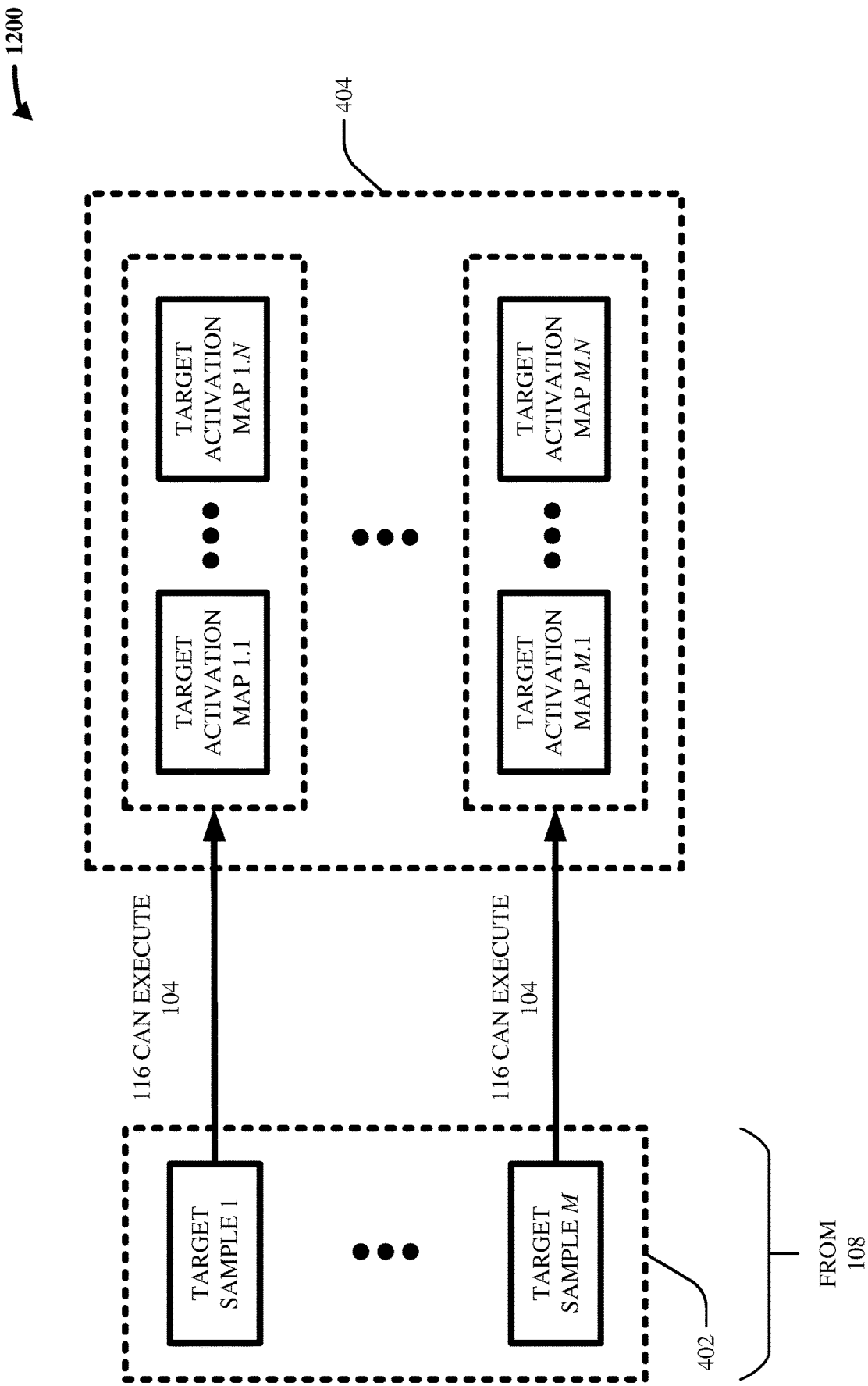

FIGS. 11-12 illustrate block diagrams of example, non-limiting target activation maps of a deep learning model in accordance with one or more embodiments described herein. Those having ordinary skill in the art will appreciate that FIGS. 11-12 are analogous to FIGS. 9-10.

As shown in FIG. 11, a target sample 1102, which can come from the target dataset 108, can be fed to the input layer 802 of the deep learning model 104. In various instances, the set of hidden layers 804 can then analyze the target sample 1102 during a forward pass, just as described above with respect to the training sample 902.

As shown, during the forward pass, the set of hidden layers 804 can generate a set of target activation maps 1104, just as described above with respect to the training activation maps 904. Specifically, for each of the set of hidden layers 804, the results of the non-linear activation functions of that hidden layer can be considered as an activation map from that hidden layer. So, the results of the non-linear activation functions of the neurons in the hidden layer 1 can be considered as a target activation map 1, and the results of the non-linear activation functions of the neurons in the hidden layer n can be considered as a target activation map n. Thus, the set of target activation maps 1104 can be considered as corresponding to the target sample 1102 (e.g., when the deep learning model 104 receives the target sample 1102, the set of target activation maps 1104 can be obtained). In various aspects, the dimensionalities/sizes of each of the target activation maps 1104 can be based on the numbers of the neurons in each of the set of hidden layers 804, and thus such dimensionalities can differ for different activation maps (e.g., the hidden layer 1 can have a different number of neurons than the hidden layer n, which means that the target activation map 1 can have a different dimensionality/size than the target activation map n). However, the dimensionalities of the target activation maps 1104 can be respectively equal to the dimensionalities of the training activation maps 904 (e.g., the training activation map 1 and the target activation map 1 are both based on the hidden layer 1 and thus can have the same dimensionality/size; the training activation map n and the target activation map n are both based on the hidden layer n and thus can have the same dimensionality/size).

Just as with FIG. 9, FIG. 11 shows that each hidden layer can have one corresponding activation map. However, this is a non-limiting example. In various other cases, any given hidden layer can be associated with more than one activation map (e.g., hidden layers that include multiple convolutional filters can correspond to multiple activation maps).

As shown, FIG. 12 illustrates example and non-limiting embodiments of the target samples 402 and the target activation maps 404. Specifically, the target activation map component 116 can select m samples from the target dataset 108, for any suitable positive integer m (e.g., it can be the case that m is not equal to k). Thus, there can be m samples in the target samples 402 (e.g., target sample 1 to target sample m). In various cases, the target activation map component 116 can independently feed each of the target samples 402 to the deep learning model 104, thereby yielding n target activation maps per target sample. Specifically, target activation map 1.1 to target activation map 1.n can correspond to the target sample 1, and target activation map m.1 to target activation map m.n can correspond to the target sample m. In other words, in this non-limiting example, there can be m times n target activation maps in the target activation maps 404 (e.g., m sets of n target activation maps, respectively corresponding to m target samples).

Figure 13:
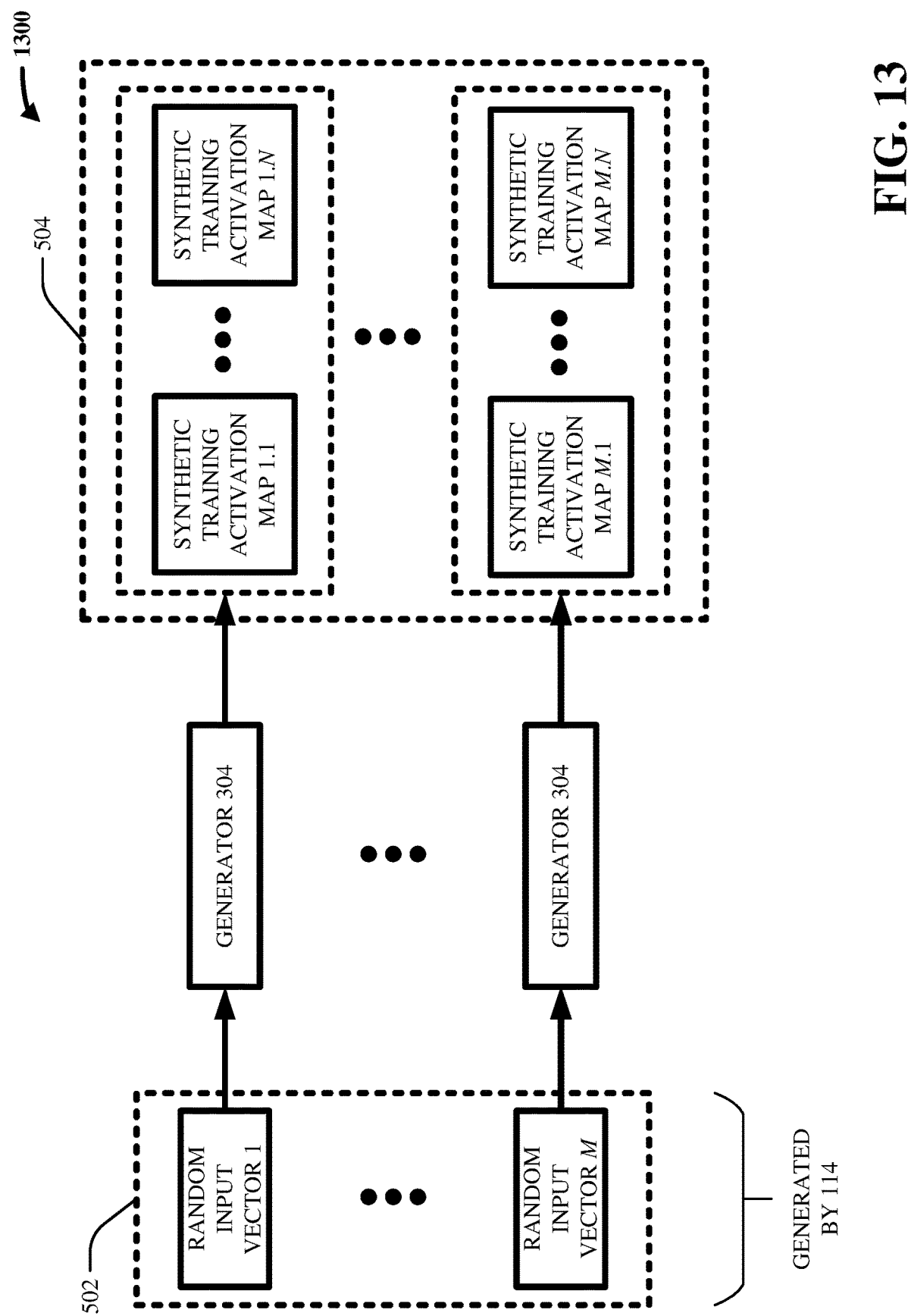
FIGS. 13-15 illustrate block diagrams of example, non-limiting synthetic training activation maps of a deep learning model in accordance with one or more embodiments described herein.
Figure 14:
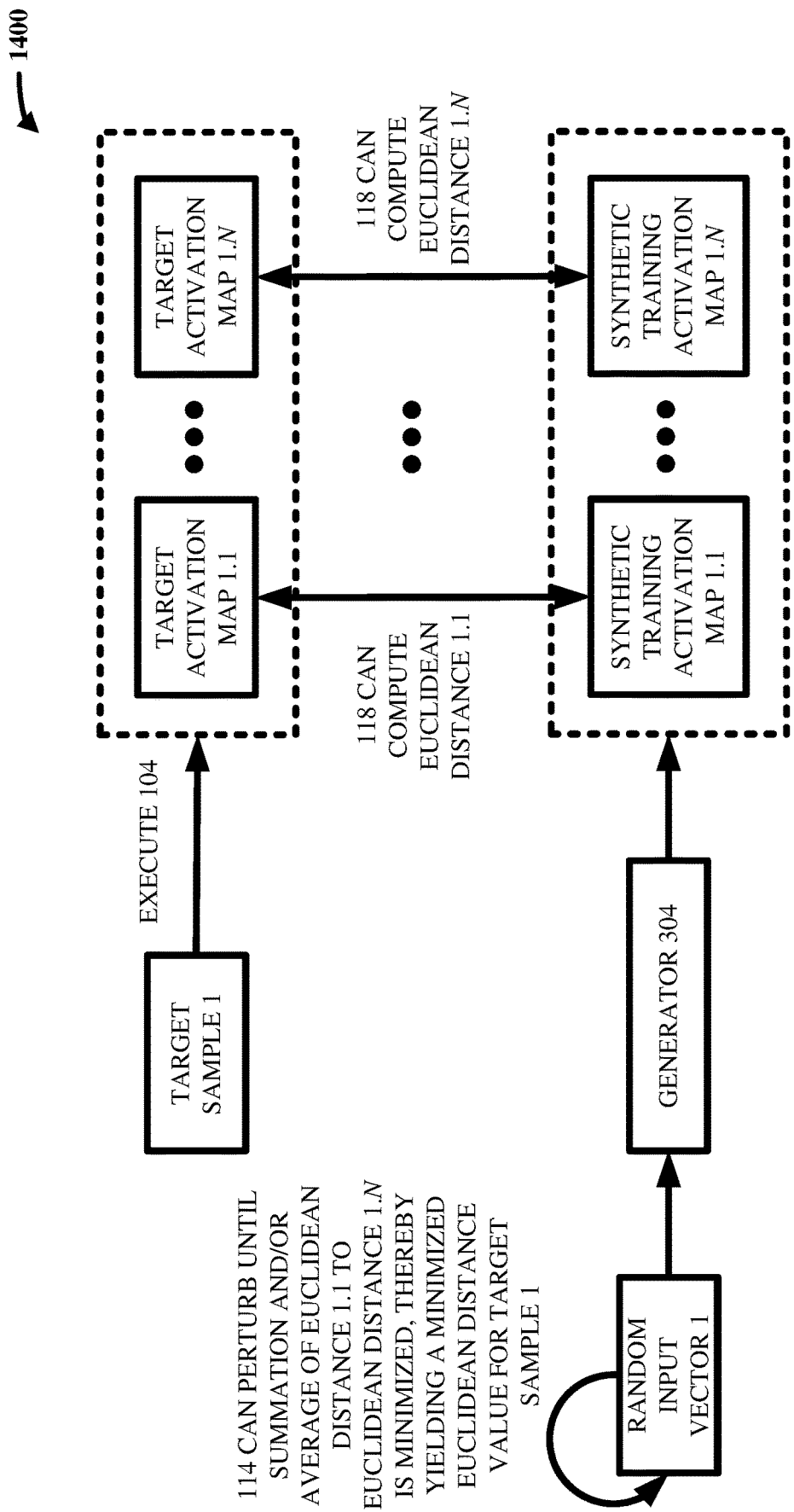
Figure 15:
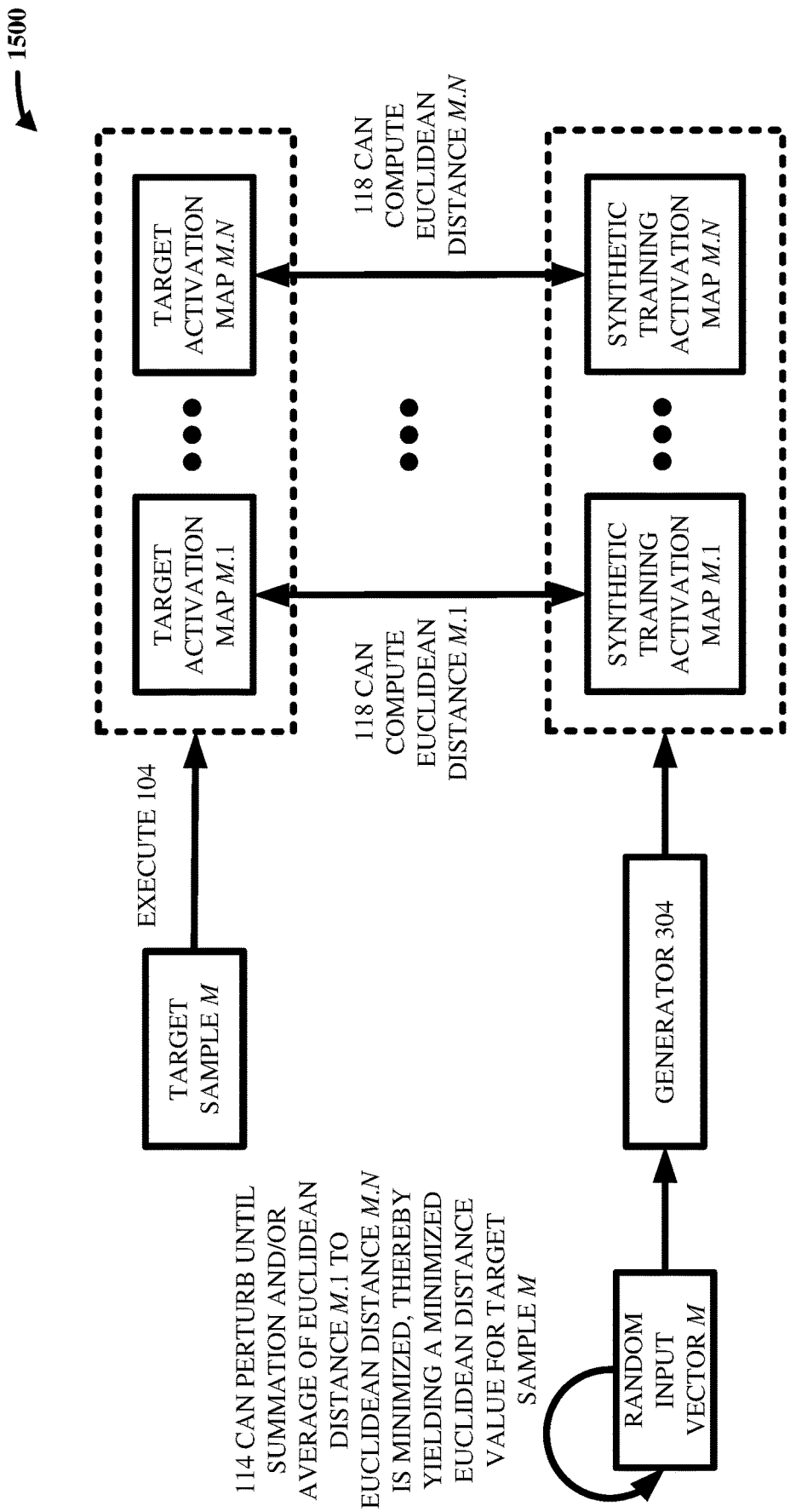

FIGS. 13-15 illustrate block diagrams of example, non-limiting synthetic training activation maps of a deep learning model in accordance with one or more embodiments described herein.

As shown, FIG. 13 depicts non-limiting embodiments of the random input vectors 502 and the synthetic training activation maps 504. In various aspects, the training activation map component 114 can generate m different random input vectors (e.g., random input vector 1 to random input vector m). That is, the training activation map component 114 can generate one random input vector per target sample. In various cases, each of the m random input vectors can be independently fed to the generator 304, which can cause the generator 304 to generate n synthetic training activation maps per random input vector. As shown, when the generator 304 receives the random input vector 1, the generator 304 can produce n synthetic training activation maps that correspond to the random input vector 1 (e.g., synthetic training activation map 1.1 to synthetic training activation map 1.n). Similarly, when the generator 304 receives the random input vector m, the generator 304 can produce n synthetic training activation maps that correspond to the random input vector m (e.g., synthetic training activation map m.1 to synthetic training activation map m.n). Thus, in this non-limiting example, the synthetic training activation maps 504 can include a total of m times n activation maps (e.g., m sets of n activation maps).

As explained above, the distance component 118 can compute Euclidean distances between the synthetic training activation maps 504 and the target activation maps 404, and the training activation map component 114 can iteratively perturb the random input vectors 502 until these computed Euclidean distances are collectively minimized. FIGS. 14-15 clarify this.

As explained above and as shown again in FIG. 14, when the target sample 1 is fed to the deep learning model 104, the target activation map 1.1 to the target activation map 1.n can result. Moreover, when the random input vector 1 is fed to the generator 304, the synthetic training activation map 1.1 to the synthetic training activation map 1.n can result. In various instances, the target activation map 1.1 can be considered as corresponding to the synthetic training activation map 1.1, the target activation map 1.n can be considered as corresponding to the synthetic training activation map 1.n, and so on. These can thus be considered as corresponding pairs of activation maps. In various cases, the distance component 118 can compute a Euclidean distance for each of these corresponding pairs. Specifically, the distance component 118 can compute a Euclidean distance 1.1 that is based on the target activation map 1.1 and the synthetic training activation map 1.1, the distance component 118 can compute a Euclidean distance 1.n that is based on the target activation map 1.n and the synthetic training activation map 1.n, and so on. As those having ordinary skill in the art will appreciate, the Euclidean distance between two arrays can be computed by calculating the element-wise differences between the arrays, squaring those differences, summing those squares, and then computing the square root of the sum. In various cases, the Euclidean distance can be considered as a measure of similarity between two arrays. Thus, the Euclidean distance 1.1 can be considered as a measure of the similarity and/or dissimilarity between the target activation map 1.1 and the synthetic training activation map 1.1, the Euclidean distance 1.n can be considered as a measure of the similarity and/or dissimilarity between the target activation map 1.n and the synthetic training activation map 1.n, and so on.

In various aspects, as shown in FIG. 14, the training activation map component 114 can iteratively perturb the random input vector 1 until the Euclidean distance 1.1 to the Euclidean distance 1.n are collectively minimized. For example, the Euclidean distance 1.1 to the Euclidean distance 1.n can be summed, and the random input vector 1 can be iteratively perturbed until the sum of the Euclidean distance 1.1 to the Euclidean distance 1.n reaches a minimum value and/or falls below a minimum threshold. As another example, the Euclidean distance 1.1 to the Euclidean distance 1.n can be averaged, and the random input vector 1 can be iteratively perturbed until the average of the Euclidean distance 1.1 to the Euclidean distance 1.n reaches a minimum value and/or falls below a minimum threshold. In any case, the result can be that a minimized Euclidean distance value is achieved for the target sample 1 (e.g., a minimized sum and/or a minimized average).

FIG. 15 is analogous to FIG. 14. As explained above and as shown again in FIG. 15, when the target sample m is fed to the deep learning model 104, the target activation map m.1 to the target activation map m.n can result. Moreover, when the random input vector m is fed to the generator 304, the synthetic training activation map m.1 to the synthetic training activation map m.n can result. In various instances, the target activation map m.1 can be considered as corresponding to the synthetic training activation map m.1, the target activation map m.n can be considered as corresponding to the synthetic training activation map m.n, and so on. These can thus be considered as corresponding pairs of activation maps. In various cases, the distance component 118 can compute a Euclidean distance for each of these corresponding pairs. Specifically, the distance component 118 can compute a Euclidean distance m.1 that is based on the target activation map m.1 and the synthetic training activation map m.1, the distance component 118 can compute a Euclidean distance m.n that is based on the target activation map m.n and the synthetic training activation map m.n, and so on. As mentioned above, the Euclidean distance m.1 can be considered as a measure of the similarity and/or dissimilarity between the target activation map m.1 and the synthetic training activation map m.1, the Euclidean distance m.n can be considered as a measure of the similarity and/or dissimilarity between the target activation map m.n and the synthetic training activation map m.n, and so on.

In various aspects, as shown in FIG. 15, the training activation map component 114 can iteratively perturb the random input vector m until the Euclidean distance m.1 to the Euclidean distance m.n are collectively minimized. For example, the Euclidean distance m.1 to the Euclidean distance m.n can be summed, and the random input vector m can be iteratively perturbed until the sum of the Euclidean distance m.1 to the Euclidean distance m.n reaches a minimum value and/or falls below a minimum threshold. As another example, the Euclidean distance m.1 to the Euclidean distance m.n can be averaged, and the random input vector m can be iteratively perturbed until the average of the Euclidean distance m.1 to the Euclidean distance m.n reaches a minimum value and/or falls below a minimum threshold. In any case, the result can be that a minimized Euclidean distance value is achieved for the target sample m (e.g., a minimized sum and/or a minimized average).

Figure 16:
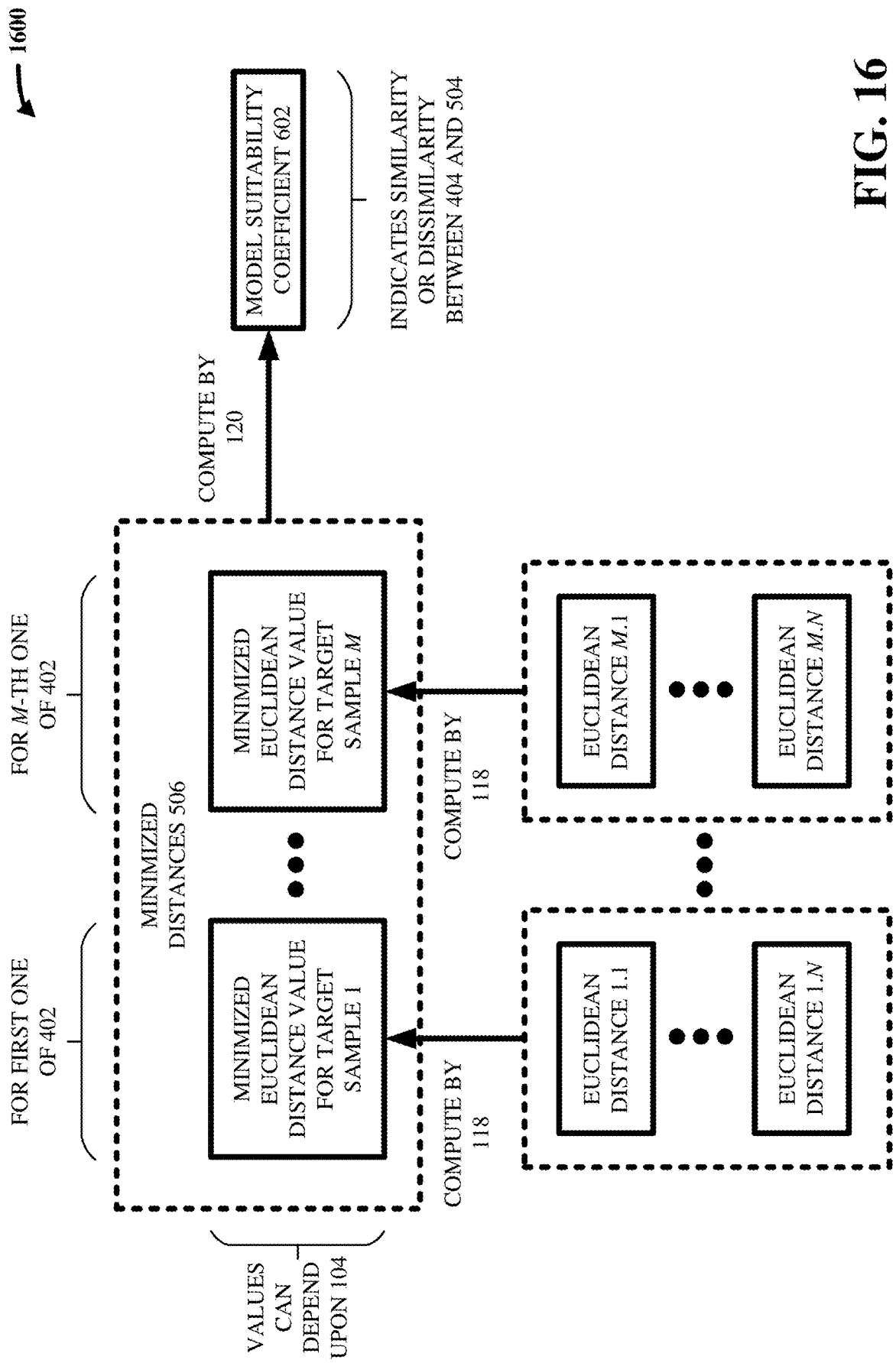
FIG. 16 illustrates a block diagram of example, non-limiting minimized distances between activation maps in accordance with one or more embodiments described herein.

FIG. 16 illustrates a block diagram of example, non-limiting minimized distances between activation maps in accordance with one or more embodiments described herein. More specifically, FIG. 16 depicts an example and non-limiting embodiment of the minimized distances 506.

As shown and as explained above, the distance component 118 can compute a minimized Euclidean distance value for each of the target samples 402. Specifically, the distance component 118 can compute a minimized Euclidean distance value for the target sample 1, based on the Euclidean distance 1.1 to the Euclidean distance 1.n (e.g., by summing and/or averaging the Euclidean distance 1.1 to the Euclidean distance 1.n). Moreover, the distance component 118 can compute a minimized Euclidean distance value for the target sample m, based on the Euclidean distance m.1 to the Euclidean distance m.n (e.g., by summing and/or averaging the Euclidean distance m.1 to the Euclidean distance m.n). In various aspects, the coefficient component 120 can aggregate these m minimized Euclidean distance values via any suitable mathematical and/or statistical technique to generate the model suitability coefficient 602. For example, the coefficient component 120 can compute the average of these m minimized Euclidean distance values, and can divide such average by a maximum possible Euclidean distance value. Those having ordinary skill in the art will appreciate that such a maximum possible Euclidean distance value can depend on the dimensionalities/sizes of the activation maps of the deep learning model 104 and/or on the value magnitudes of the activation maps of the deep learning model 104. The resulting ratio can be considered as the model suitability coefficient 602. Those having ordinary skill in the art will appreciate that such a ratio is merely one non-limiting example of how the model suitability coefficient 602 can be computed based on the minimized distances 506. In various other embodiments, any other suitable mathematical formulas and/or mathematical manipulations of the minimized distances 506 can be implemented to generate a numerical result that quantifies a level of similarity and/or dissimilarity between the target activation maps 404 and the synthetic training activation maps 504. No matter the mathematical formulas and/or mathematical manipulations implemented, and no matter the dimensionality of such a numerical result, such a numerical result can be considered as the model suitability coefficient 602.

Figure 17:
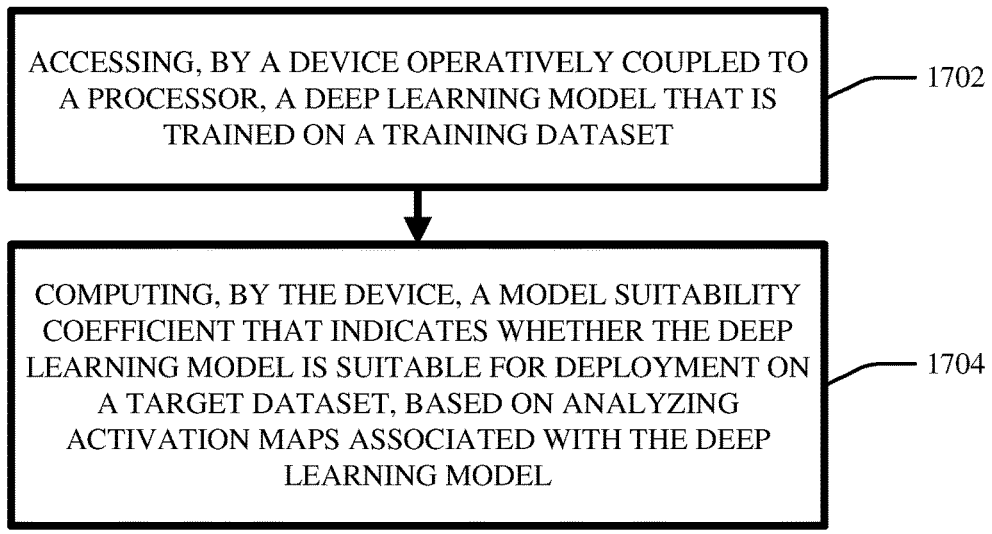
FIGS. 17-18 illustrate flow diagrams of example, non-limiting computer-implemented methods that facilitate model suitability coefficients based on generative adversarial networks and activation maps in accordance with one or more embodiments described herein.
Figure 18:
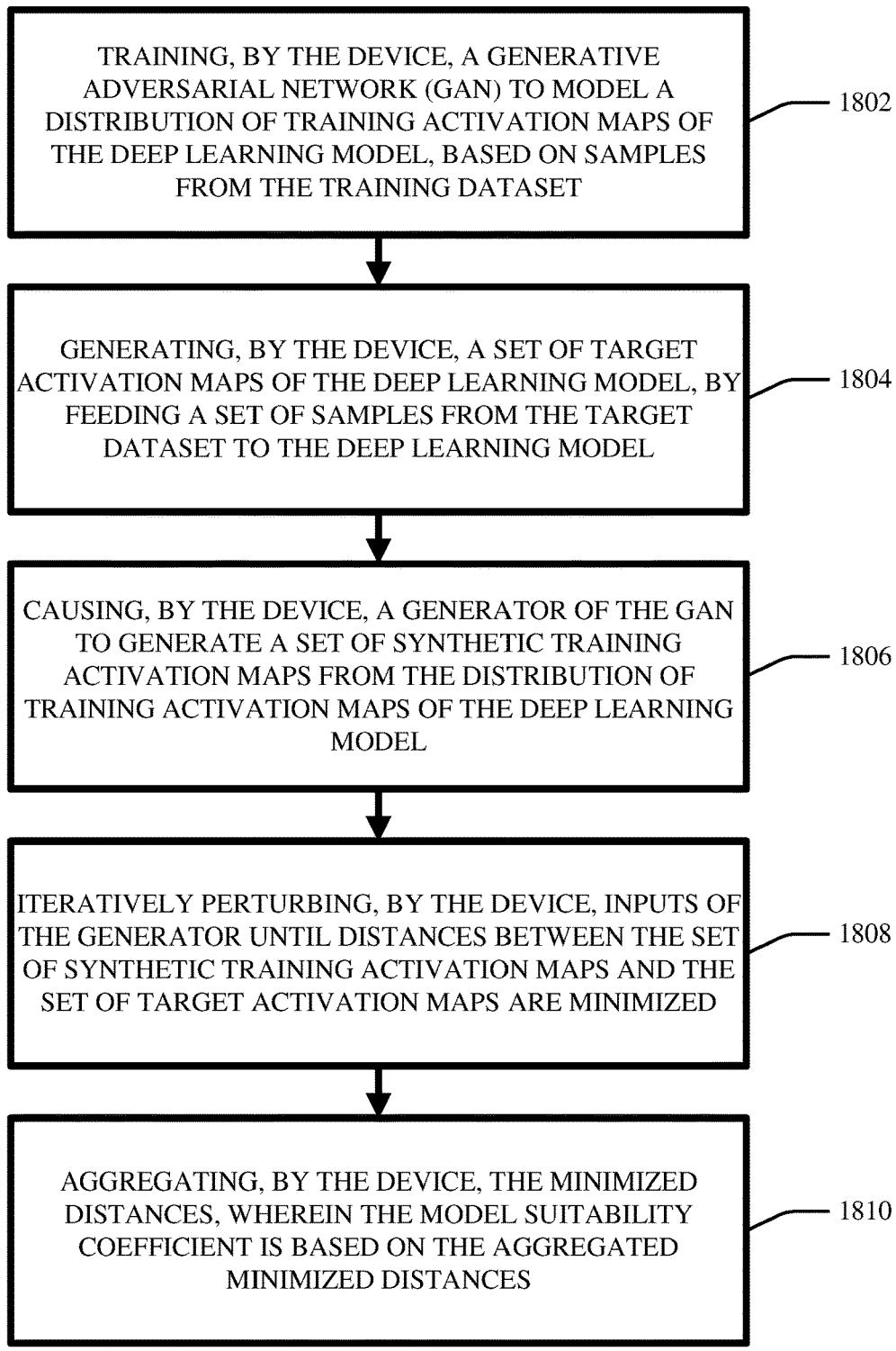

FIGS. 17-18 illustrate flow diagrams of example, non-limiting computer-implemented methods 1700 and 1800 that can facilitate model suitability coefficients based on generative adversarial networks and activation maps in accordance with one or more embodiments described herein.

Consider the computer-implemented method 1700. In various embodiments, act 1702 can include accessing, by a device (e.g., 102) operatively coupled to a processor, a deep learning model (e.g., 104) that is trained on a training dataset (e.g., 106).

In various cases, act 1704 can include computing, by the device (e.g., 120), a model suitability coefficient (e.g., 602) that indicates whether the deep learning model is suitable for deployment on a target dataset (e.g., 108), based on analyzing activation maps (e.g., 204, 404, and/or 504) associated with the deep learning model.

Now, consider the computer-implemented method 1800. In various embodiments, act 1802 can include training, by the device (e.g., 114), a generative adversarial network (e.g., 302) to model a distribution of training activation maps (e.g., 204) of the deep learning model, based on samples (e.g., 202) from the training dataset.

In various aspects, act 1804 can include generating, by the device (e.g., 116), a set of target activation maps (e.g., 404) of the deep learning model, by feeding a set of samples (e.g., 402) from the target dataset to the deep learning model.

In various instances, act 1806 can include causing, by the device (e.g., 114), a generator (e.g., 304) of the GAN to generate a set of synthetic training activation maps (e.g., 504) from the distribution of training activation maps of the deep learning model.

In various cases, act 1808 can include iteratively perturbing, by the device (e.g., 114), inputs (e.g., 502) of the generator until distances (e.g., 506) between the set of synthetic training activation maps and the set of target activation maps are minimized.

In various aspects, act 1810 can include aggregating, by the device (e.g., 120), the minimized distances, wherein the model suitability coefficient is based on the aggregated minimized distances.

Although not explicitly shown in FIG. 18, the computer-implemented method 1800 can further comprise: comparing, by the device (e.g., 120), the model suitability coefficient to a threshold value; and determining, by the device (e.g., 120), that the deep learning model is not suitable for deployment on the target dataset if the model suitability coefficient fails to satisfy the threshold value.

Understanding a deep learning model's generalization capabilities can be paramount to successfully deploying the deep learning model. Evaluating such generalization capabilities can be especially challenging in clinical/healthcare contexts, where medical data can vary widely in terms of demography and/or device modality. If a deep learning model is deployed on a target dataset for which the deep learning model is not suitable, suboptimal performance of the deep learning model can result.

Embodiments of the subject innovation can address this problem by providing systems and/or computer-implemented techniques that can automatically evaluate the suitability of a deep learning model to be deployed on a target dataset. As explained herein, this evaluation can be facilitated by utilizing a GAN to analyze activation maps of the deep learning model. Based on such analysis, a model suitability coefficient can be computed and compared to a threshold to determine suitability. The inventors of various embodiments of the subject innovation recognized that, for successful model generalization, activation maps for target samples should be similar to activation maps for training samples. However, because it can be impracticable in inference time to compute all possible activation maps of the deep learning model based on all possible samples from the training dataset, a GAN can be implemented to learn, model, and/or otherwise abstract the distribution/patterns of the activation maps.

Specifically, when given a trained deep learning model and samples from a target dataset (e.g., annotated or unannotated), the following can be performed: a GAN can be trained to model the distributions/patterns of training activation maps from hidden layers of the deep learning model when the deep learning model is fed samples from the training dataset; target activation maps can be generated by feeding the deep learning model samples from the target dataset; for every target sample, the closest training activation maps can be computed by iteratively perturbing an input of the generator of the GAN; Euclidean distances between the closest training activation maps and the target activation maps can be computed; and such Euclidean distances can be aggregated/averaged to yield a model suitability coefficient. In various embodiments, a computerized tool that can facilitate such actions is not limited to any particular type of deep learning model. Instead, in various cases, such a computerized tool can be used across different deep learning models, without change.

Figure 19:
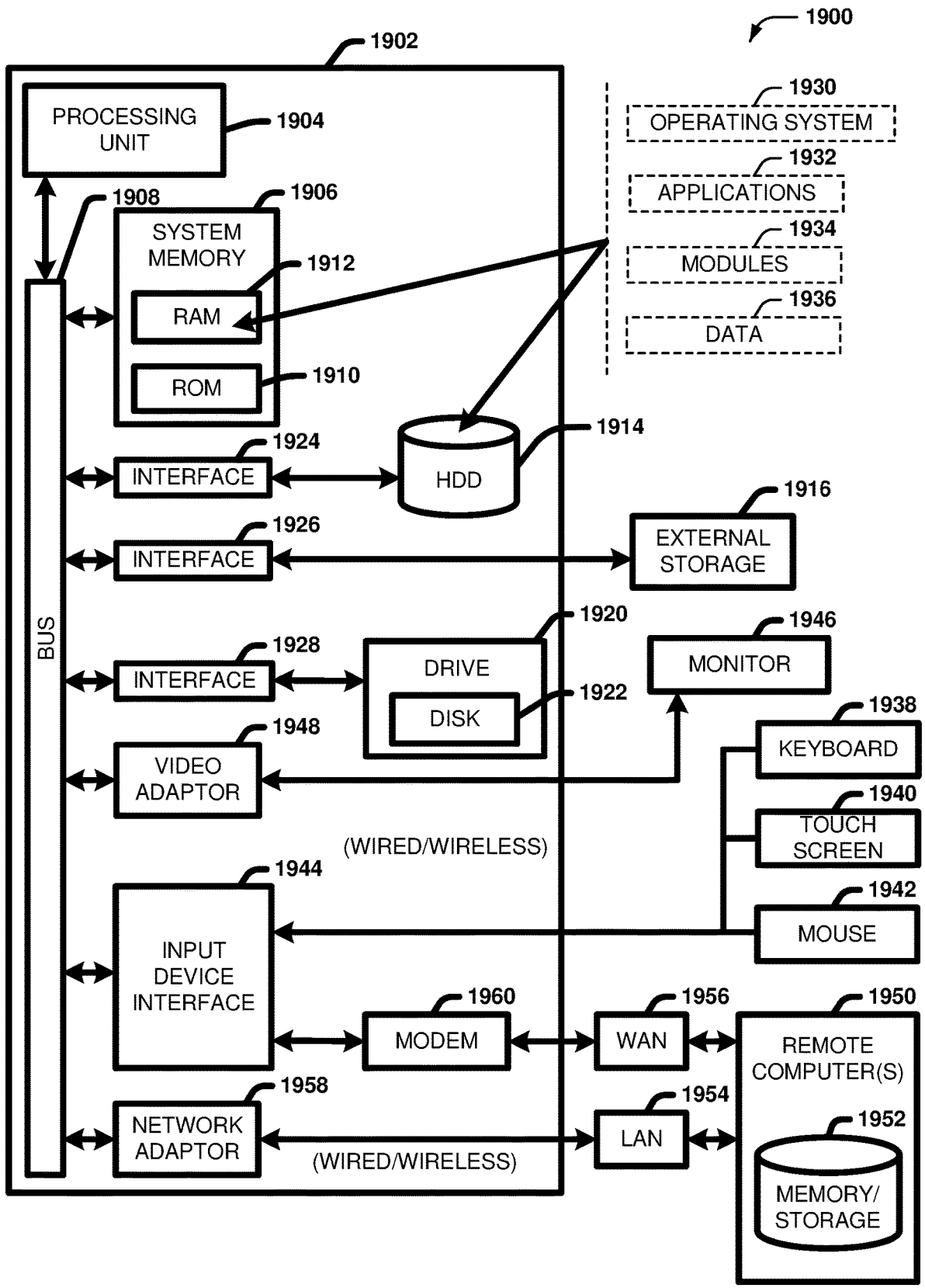
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB)

and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
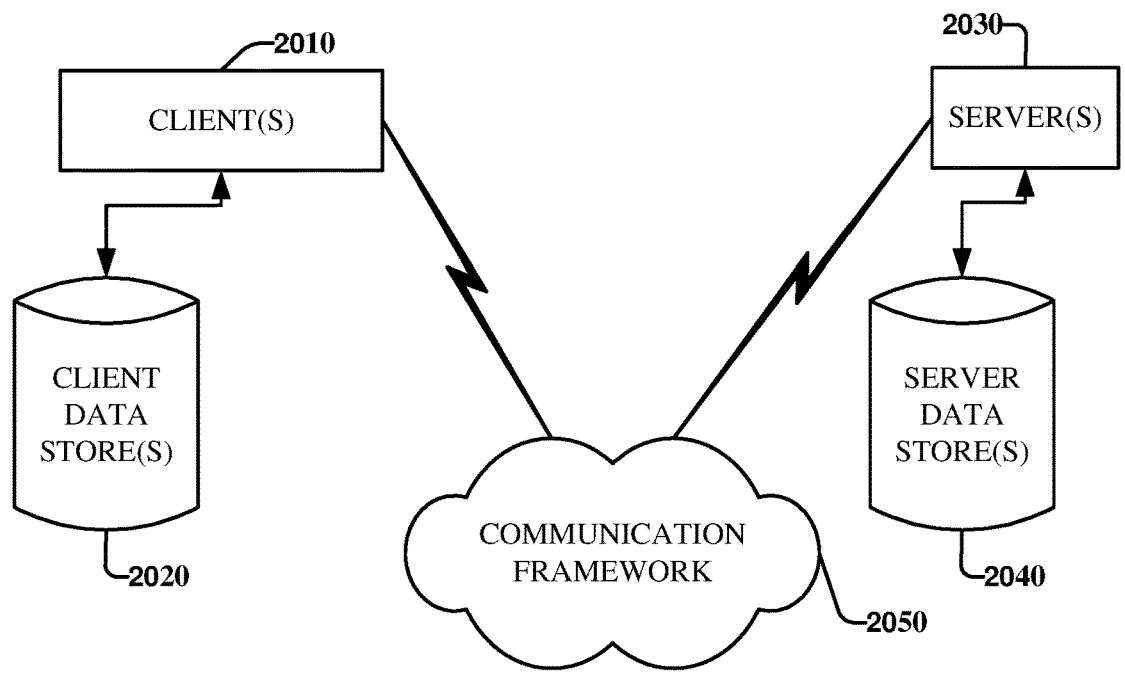
FIG. 20 illustrates an example networking environment operable to execute various implementations described herein.

FIG. 20 is a schematic block diagram of a sample computing environment 2000 with which the disclosed subject matter can interact. The sample computing environment 2000 includes one or more client(s) 2010. The client(s) 2010 can be hardware and/or software (e.g., threads, processes, computing devices). The sample computing environment 2000 also includes one or more server(s) 2030. The server(s) 2030 can also be hardware and/or software (e.g., threads, processes, computing devices). The servers 2030 can house threads to perform transformations by employing one or more embodiments as described herein, for example. One possible communication between a client 2010 and a server 2030 can be in the form of a data packet adapted to be transmitted between two or more computer processes. The sample computing environment 2000 includes a communication framework 2050 that can be employed to facilitate communications between the client(s) 2010 and the server(s) 2030. The client(s) 2010 are operably connected to one or more client data store(s) 2020 that can be employed to store information local to the client(s) 2010. Similarly, the server(s) 2030 are operably connected to one or more server data store(s) 2040 that can be employed to store information local to the servers 2030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject claimed innovation are provided in the subject matter that follows:

1. A system, comprising: a processor that executes computer-executable instructions stored in a computer-readable memory, which causes the processor to: access a deep learning model that is trained on a training dataset; and compute a model suitability coefficient that indicates whether the deep learning model is suitable for deployment on a target dataset, based on analyzing activation maps associated with the deep learning model.

2. The system of any preceding clause, wherein the computer-executable instructions are further executable to cause the processor to: train a generative adversarial network (GAN) to model a distribution of training activation maps of the deep learning model, based on samples from the training dataset.

3. The system of any preceding clause, wherein the computer-executable instructions are further executable to cause the processor to: generate a set of target activation maps of the deep learning model, by feeding a set of samples from the target dataset to the deep learning model.

4. The system of any preceding clause, wherein the computer-executable instructions are further executable to cause the processor to: cause a generator of the GAN to generate a set of synthetic training activation maps from the distribution of training activation maps of the deep learning model.

5. The system of any preceding clause, wherein the computer-executable instructions are further executable to cause the processor to: iteratively perturb inputs of the generator until distances between the set of synthetic training activation maps and the set of target activation maps are minimized.

6. The system of any preceding clause, wherein the computer-executable instructions are further executable to cause the processor to: aggregate the minimized distances, wherein the model suitability coefficient is based on the aggregated minimized distances.

7. The system of any preceding clause, wherein the computer-executable instructions are further executable to cause the processor to: compare the model suitability coefficient to a threshold value; and determine that the deep learning model is not suitable for deployment on the target dataset if the model suitability coefficient fails to satisfy the threshold value.

8. A computer-implemented method, comprising: accessing, by a device operatively coupled to a processor, a deep learning model that is trained on a training dataset; and computing, by the device, a model suitability coefficient that indicates whether the deep learning model is suitable for deployment on a target dataset, based on analyzing activation maps associated with the deep learning model.

9. The computer-implemented method of any preceding clause, further comprising: training, by the device, a generative adversarial network (GAN) to model a distribution of training activation maps of the deep learning model, based on samples from the training dataset.

10. The computer-implemented method of any preceding clause, further comprising: generating, by the device, a set of target activation maps of the deep learning model, by feeding a set of samples from the target dataset to the deep learning model.

11. The computer-implemented method of any preceding clause, further comprising: causing, by the device, a generator of the GAN to generate a set of synthetic training activation maps from the distribution of training activation maps of the deep learning model.

12. The computer-implemented method of any preceding clause, further comprising: iteratively perturbing, by the device, inputs of the generator until distances between the set of synthetic training activation maps and the set of target activation maps are minimized.

13. The computer-implemented method of any preceding clause, further comprising: aggregating, by the device, the minimized distances, wherein the model suitability coefficient is based on the aggregated minimized distances.

14. The computer-implemented method of any preceding clause, further comprising: comparing, by the device, the model suitability coefficient to a threshold value; and determining, by the device, that the deep learning model is not suitable for deployment on the target dataset if the model suitability coefficient fails to satisfy the threshold value.

15. A computer program product for facilitating model suitability coefficients based on generative adversarial networks and activation maps, the computer program product comprising a computer-readable memory having program instructions embodied therewith, the program instructions executable by a processor to cause the processor to: access a deep learning model that is trained on a training dataset; and compute a model suitability coefficient that indicates whether the deep learning model is suitable for deployment on a target dataset, based on analyzing activation maps associated with the deep learning model.

16. The computer program product of any preceding clause, wherein the program instructions are further executable to cause the processor to: train a generative adversarial network (GAN) to model a distribution of training activation maps of the deep learning model, based on samples from the training dataset.

17. The computer program product of any preceding clause, wherein the program instructions are further executable to cause the processor to: generate a set of target activation maps of the deep learning model, by feeding a set of samples from the target dataset to the deep learning model.

18. The computer program product of any preceding clause, wherein the program instructions are further executable to cause the processor to: cause a generator of the GAN to generate a set of synthetic training activation maps from the distribution of training activation maps of the deep learning model.

19. The computer program product of any preceding clause, wherein the program instructions are further executable to cause the processor to: iteratively perturb inputs of the generator until distances between the set of synthetic training activation maps and the set of target activation maps are minimized.

20. The computer program product of any preceding clause, wherein the program instructions are further executable to cause the processor to: aggregate the minimized distances, wherein the model suitability coefficient is based on the aggregated minimized distances.

What is claimed is:

1. A system, comprising:
a processor that executes computer-executable instructions stored in a computer-readable memory, which causes the processor to:
    access a deep learning model that is trained on a training dataset;
    compute a model suitability coefficient that indicates whether the deep learning model is suitable for deployment on a target dataset, by:
        training a generative adversarial network (GAN) to learn a distribution of hidden activation maps that the deep learning model produces for a set of first samples from the training dataset;
        executing the deep learning model on a set of second samples from the target dataset, thereby causing the deep learning model to produce a set of target hidden activation maps;
        causing a generator of the GAN to generate a set of synthetic hidden activation maps from the learned distribution of the deep learning model; and
        iteratively perturbing inputs of the generator until distances between the set of synthetic hidden activation maps and the set of target hidden activation maps are minimized, wherein the model suitability coefficient is an aggregation of the minimized distances; and
    in response to a determination that the model suitability coefficient does not satisfy a threshold value, transmitting an electronic notification indicating that the deep learning model warrants fine-tuning before being executed on a remainder of the target dataset.

2. A computer-implemented method, comprising:
accessing, by a device operatively coupled to a processor, a deep learning model that is trained on a training dataset;
computing, by the device, a model suitability coefficient that indicates whether the deep learning model is suitable for deployment on a target dataset, by:
    training, by the device, a generative adversarial network (GAN) to learn a distribution of hidden activation maps that the deep learning model produces for a set of first samples from the training dataset;
    executing, by the device, the deep learning model on a set of second samples from the target dataset, thereby causing the deep learning model to produce a set of target hidden activation maps;
    causing, by the device, a generator of the GAN to generate a set of synthetic hidden activation maps from the learned distribution of the deep learning model; and
    iteratively perturbing, by the device, inputs of the generator until distances between the set of synthetic hidden activation maps and the set of target hidden activation maps are minimized, wherein the model suitability coefficient is an aggregation of the minimized distances; and
transmitting, by the device and in response to a determination that the model suitability coefficient does not satisfy a threshold value, an electronic notification indicating that the deep learning model warrants fine-tuning before being executed on a remainder of the target dataset.

3. A computer program product for facilitating model suitability coefficients based on generative adversarial networks and activation maps, the computer program product comprising a non-transitory computer-readable memory having program instructions embodied therewith, the program instructions executable by a processor to cause the processor to:
access a deep learning model that is trained on a training dataset;
compute a model suitability coefficient that indicates whether the deep learning model is suitable for deployment on a target dataset, by:
    training a generative adversarial network (GAN) to learn a distribution of hidden activation maps that the deep learning model produces for a set of first samples from the training dataset;
    executing the deep learning model on a set of second samples from the target dataset, thereby causing the deep learning model to produce a set of target hidden activation maps;
    causing a generator of the GAN to generate a set of synthetic hidden activation maps from the learned distribution of the deep learning model; and
    iteratively perturbing inputs of the generator until distances between the set of synthetic hidden activation maps and the set of target hidden activation maps are minimized, wherein the model suitability coefficient is an aggregation of the minimized distances; and
in response to a determination that the model suitability coefficient does not satisfy a threshold value, transmit an electronic notification indicating that the deep learning model warrants fine-tuning before being executed on a remainder of the target dataset.

* * * * *